(12) United States Patent
Berk et al.

(10) Patent No.: US 11,812,725 B2
(45) Date of Patent: Nov. 14, 2023

(54) MULTIPURPOSE ANIMAL TRANSPORT SYSTEM

(71) Applicants: Ian Berk, Astoria, NY (US); Emily Miethner, Astoria, NY (US)

(72) Inventors: Ian Berk, Astoria, NY (US); Emily Miethner, Astoria, NY (US)

(*) Notice: Subject to any disclaimer, the term of this patent is extended or adjusted under 35 U.S.C. 154(b) by 0 days.

(21) Appl. No.: 17/482,326

(22) Filed: Sep. 22, 2021

(65) Prior Publication Data
US 2022/0110294 A1    Apr. 14, 2022

Related U.S. Application Data

(60) Provisional application No. 63/081,467, filed on Sep. 22, 2020.

(51) Int. Cl.
*A01K 1/02*     (2006.01)

(52) U.S. Cl.
CPC .................................. *A01K 1/029* (2013.01)

(58) Field of Classification Search
CPC .................................................... A01K 1/029
USPC ..... 224/148.6, 575, 576, 153, 627, 659, 224
See application file for complete search history.

(56) References Cited

U.S. PATENT DOCUMENTS

| | | | | |
|---|---|---|---|---|
| 5,176,102 A * | 1/1993 | Tracy | ...................... | A01K 1/029 224/648 |
| 5,445,302 A * | 8/1995 | Holtorf | .................. | A01K 1/029 119/497 |
| 5,927,581 A * | 7/1999 | Reddy | ........................ | A45F 3/02 224/655 |
| 6,701,871 B1 * | 3/2004 | Johnson | .................. | A01K 29/00 119/497 |
| D558,406 S * | 12/2007 | King | ............................ | D30/109 |
| D662,263 S * | 6/2012 | Chau | ........................... | D30/109 |
| D732,246 S * | 6/2015 | Eisen | ........................... | D30/109 |
| D805,762 S * | 12/2017 | Lopez Avila | .................. | D3/217 |
| D844,257 S * | 3/2019 | Fasana | ......................... | D30/109 |
| D856,602 S * | 8/2019 | Lu | ................................ | D30/109 |
| D876,826 S * | 3/2020 | Watson | .......................... | D3/217 |
| D883,658 S * | 5/2020 | Lu | .................................. | D3/217 |
| D883,659 S * | 5/2020 | Lu | .................................. | D3/217 |
| D885,043 S * | 5/2020 | Lu | .................................. | D3/217 |
| D902,582 S * | 11/2020 | Huang | .......................... | D3/217 |
| D909,049 S * | 2/2021 | Watson | ........................ | D30/151 |
| D909,686 S * | 2/2021 | Berk | ............................ | D30/109 |
| D910,242 S * | 2/2021 | Berk | ............................ | D30/109 |
| D910,243 S * | 2/2021 | Watson | ........................ | D3/216 |
| D914,297 S * | 3/2021 | Huang | ......................... | D30/109 |
| D914,298 S * | 3/2021 | Huang | ......................... | D30/109 |
| D917,874 S * | 5/2021 | Zhang | ........................... | D3/217 |

(Continued)

*Primary Examiner* — Joshua J Michener
*Assistant Examiner* — Henry Hooper Mudd
(74) *Attorney, Agent, or Firm* — Bay State IP, LLC

(57) ABSTRACT

A wearable apparatus for transporting an animal in worn about the human torso wherein the animal will rest in a secured portion similar to the body of a backpack on an individual's back with straps that rest over a human's shoulders. The carrier provides plenty of breathable openings for the animal, as well as several pockets on the device and a hydration pass for the human, as well. There is an adjustable strap that permits the carrier to be draped over the shoulder, across the human chest made from a padded material, too. This device allows the pet to be carried distances while remaining safe and comfortable on one's back.

7 Claims, 37 Drawing Sheets

(56) References Cited

U.S. PATENT DOCUMENTS

| | | | |
|---|---|---|---|
| D923,326 S * | 6/2021 | Yan | D3/217 |
| D942,140 S * | 2/2022 | Fan | D3/217 |
| D944,716 S * | 3/2022 | Xu | D12/407 |
| D961,910 S * | 8/2022 | Yan | D3/217 |
| 2003/0127060 A1* | 7/2003 | Yeung | A01K 1/03 |
| | | | 119/497 |
| 2014/0196668 A1* | 7/2014 | Bindi | A01K 1/02 |
| 2014/0263517 A1* | 9/2014 | Redli | A45F 3/04 |
| 2017/0172102 A1* | 6/2017 | Rivera | A45F 3/04 |

* cited by examiner

MULTIPURPOSE ANIMAL TRANSPORT SYSTEM

CROSS-REFERENCE TO RELATED APPLICATION

This application claims the benefit of U.S. Provisional Patent Application No. 63/081,467, filed Sep. 22, 2020, the contents of which are herein incorporated by reference.

FIELD OF INVENTION

The present invention refers to a device to carry small pets with an individual as they travel outside the home. The device resembles a backpack to hold a small pet on one's back. This allows one to take the beloved pet on outdoors adventures ranging from walks in the park to trips to the neighbors, and much more.

BACKGROUND OF THE PRIOR ART

Over the years, many different types of pet carriers (e.g., cages, containers, and bags) have been employed by pet owners to transfer their pets. While these traditional pet carriers are capable of effectively transferring pets from one location to another, but they typically do so in a manner that is uncomfortable for the pets. Accordingly, what is needed is an enhanced pet carrier that accommodates the needs of both pet owners and pets alike. This device meets these needs.

Within the concurrent art various devices exist designed to carry one's pets. One such system illustrates an enclosure for small animals which is wearable on the front or back of an animate bearer wherein straps are attached to a solid base upon which a complete enclosure is fastened and the straps allow the pet enclosure to be suspended from the shoulders and waist of a bearer, fully freeing the arms and hands.

Another system illustrates a wearable, multi-positional apparatus and method for transporting an animal horizontally in an adjustable, body conforming apparatus worn about the human torso and the carrier consists of a convex shaped main body panel bound at its perimeter by a flexible, semi-rigid binding material.

Another system illustrates a child or animal carrier and a method of carrying a child or animal on the user's body. The carrier has two loops joined together by a connecting device with an optional sash. The method of carrying the child or animal involves wearing the loops and placing the child or animal in the loops in a variety of positions.

An additional system illustrates a pet carrier for use in transporting pets within the passenger compartments of an aircraft includes selectively closeable windows formed from mesh fabric. In this system, a fully openable end and fully openable side are illustrated for providing access to the interior of the pet carrier, an access port in the top having a full length double zipper closure and a rotatable locking member for securing the access port in the closed condition, a multifunction strap securable to the opposite ends of the pet carrier for use as a shoulder strap and securable to one end of the pet carrier for use as a pulling strap; individually removable rollers supporting the pet carrier for rolling movement over an underlying surface; and a removable floor.

Another system discloses a detachable pet carrier for housing a pet that allows the pet to rest on one or more of its interior surfaces. The pet carrier may include a roof that provides shelter for the rest area in the pet carrier's deployed configuration. The pet carrier may also include one or more bolsters on one or more of its interior surfaces to better define the boundaries of the rest area in the pet carrier's deployed configuration. The pet carrier may also include one or more pickets on its interior and or exterior surfaces.

SUMMARY OF INVENTION

The instant apparatus and system, as illustrated herein, is clearly not anticipated, rendered obvious, or even present in any of the prior art mechanisms, either alone or in any combination thereof. A versatile system, method and series of apparatuses for creating and utilizing systems for animal transportation. Thus the several embodiments of the instant apparatus are illustrated herein.

In this specification, a "user" is anyone interacting with the locking system or web service, including a person operating a portable electronic device as described herein. The words "user" and "device" (or "portable electronic device") are in some cases used interchangeably, since the device is carried and operated by the user.

The present invention provides a system, methods and accompanying apparatuses for Over the years, many different types of pet carriers (e.g., cages, containers, and bags) have been employed by pet owners to transfer their pets. While these traditional pet carriers are capable of effectively transferring pets from one location to another, but they typically do so in a manner that is uncomfortable for the pets. The instant system provides an enhanced pet carrier that accommodates the needs both of the pet and the pet owners alike.

The reason for this present device is to provide a method for carrying small pets outside the home while keeping them safe inside the secured device which is wearable. It provides benefits for both the pet owner, wherein one can easily carry the animal while being hands free and the pet remains comfortably placed within. Moreover, this device will allow one to take a small pet outside to explore open spaces or to simply take the animal to a desired location.

The instant system, which comes under the umbrella of My Cat Backpack, accomplishes numerous tasks, including safe transport of animal, yet allowing for animal freedom and comfort. Additionally, the instant device is modeled after a backpack wherein a small pet, such as a cat, may be placed inside the backpack and carried over one's shoulders. There are multiple areas where the backpack may be opened to the cavity of the device wherein the pet may be placed inside. There is also mesh and plenty of air ways to allow the pet to sit comfortably inside the backpack while it is being carried to the desired location. Moreover, there is a hydration pass, several pockets, and a clip to secure the shoulder straps on one's person.

This device makes carrying the small pet as comfortable as possible to allow for as many adventures as possible with the beloved animal.

BRIEF DESCRIPTION OF THE DRAWINGS

Advantages of the present device will be apparent from the following brief description of exemplary embodiments thereof; which description should be considered in conjunction with the accompanying drawings. Having thus described the invention in general terms, reference will now be made to the accompanying drawings, which are not necessarily drawn to scale, and wherein.

DETAILED DESCRIPTION OF SEVERAL EMBODIMENTS

The detailed description set forth below is intended as a description of presently preferred embodiments of the system and does not represent the only forms in which the present system may be construed and/or utilized. The description sets forth the functions and the sequence of the steps for producing the system and accompanying apparatus. However, it is to be understood that the same or equivalent functions and sequences may be accomplished by different embodiments and also intended to be encompassed within the scope of the system.

Figure 1:
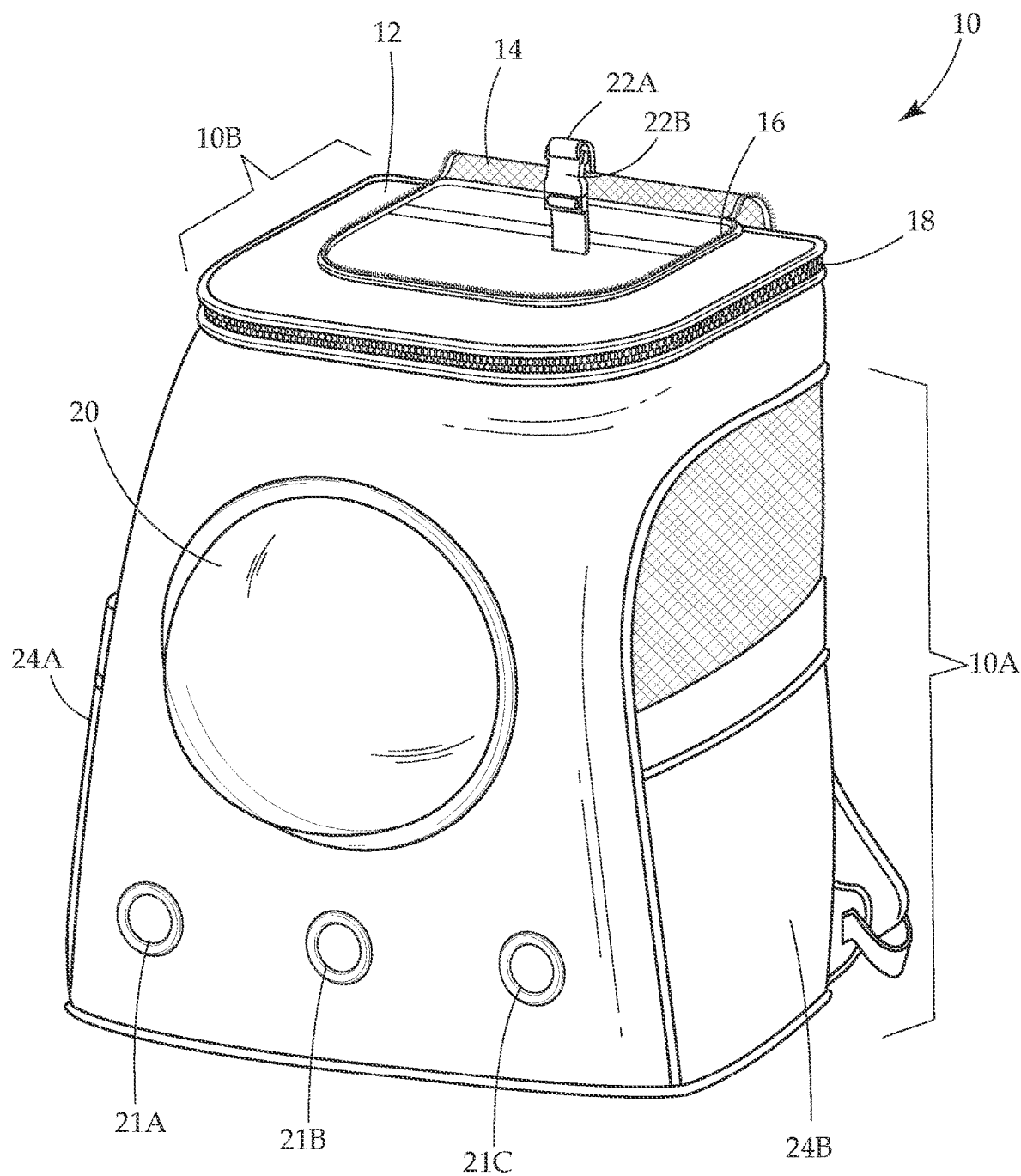
FIG. 1 is front perspective view of a preferred embodiment of the present device with a breathable mesh top, a front transparent hemispherical attachment, and a number of air holes.

In FIG. 1, illustrate a front view of one embodiment of a pet backpack 10 wherein the pet backpack 10 is made from durable black fabric. In a preferred embodiment, the main body 10a comprises three air holes 21a-c, two side water bottle pockets 24a and 25b located on the side of the main body 10a, and a transparent hemispherical attachment 20 made from sturdy glass composite at the front of the main body 10a with a number of air holes disposed on the bottom of the attachment. The transparent hemispherical attachment 20 allows for fresh year and gives pets the enrichment and stimulation they need in a safe way.

In addition, in some embodiments, the main body 10a further comprises a number of side pockets made from durable fabrics or breathable mesh for storage purposes.

A top portion 10b of the backpack 10 comprises a fabric loop 12, a mesh top 14, a zipper 16 to secure the mesh top 14 to a series of layered fabrics 12, a zipper 18 to secure the top portion 10b to the main body 10a, a strap 22a and a buckle 22b to secure the mesh top 14 when it is rolled up. The layered fabrics 14 provide extra durability for the device 10.

Figure 2:
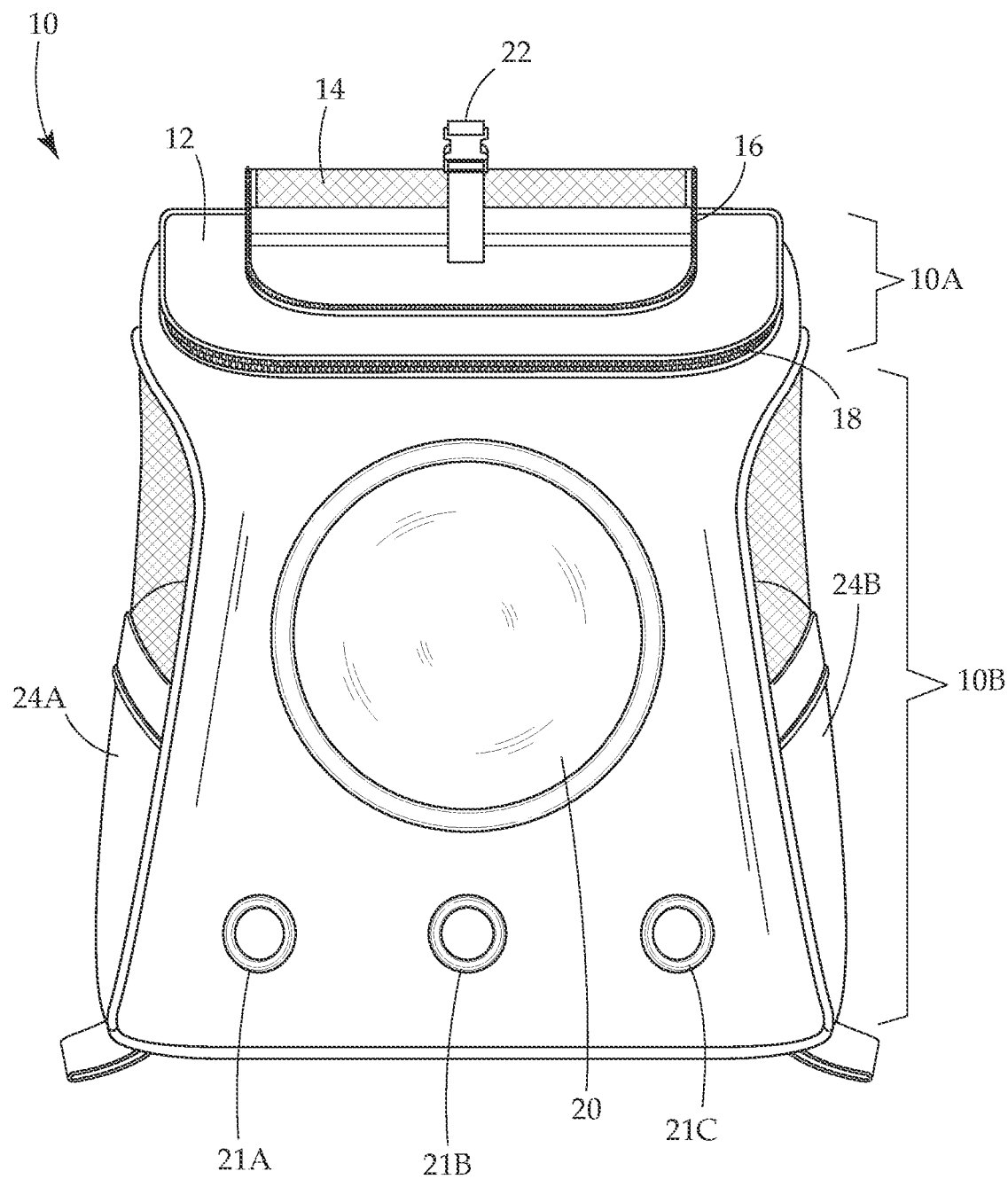
FIG. 2 is a front view of a preferred embodiment of the present device with a front transparent hemispherical attachment and a number of air holes.

FIG. 2 shows a preferred embodiment of the pet backpack 10 wherein the front transparent hemispherical attachment 20 is removably attached to the front of the main body 10b. In some embodiments, the transparent hemispherical attachment 20 can be replaced by a screen attachment or a breathable mesh front window. The interchangeable mechanism not only allows for different aesthetic appearance, it also enables a user to better protect a pet from different weather elements while allowing the pet to "hang out" comfortably inside the backpack.

Figure 3:
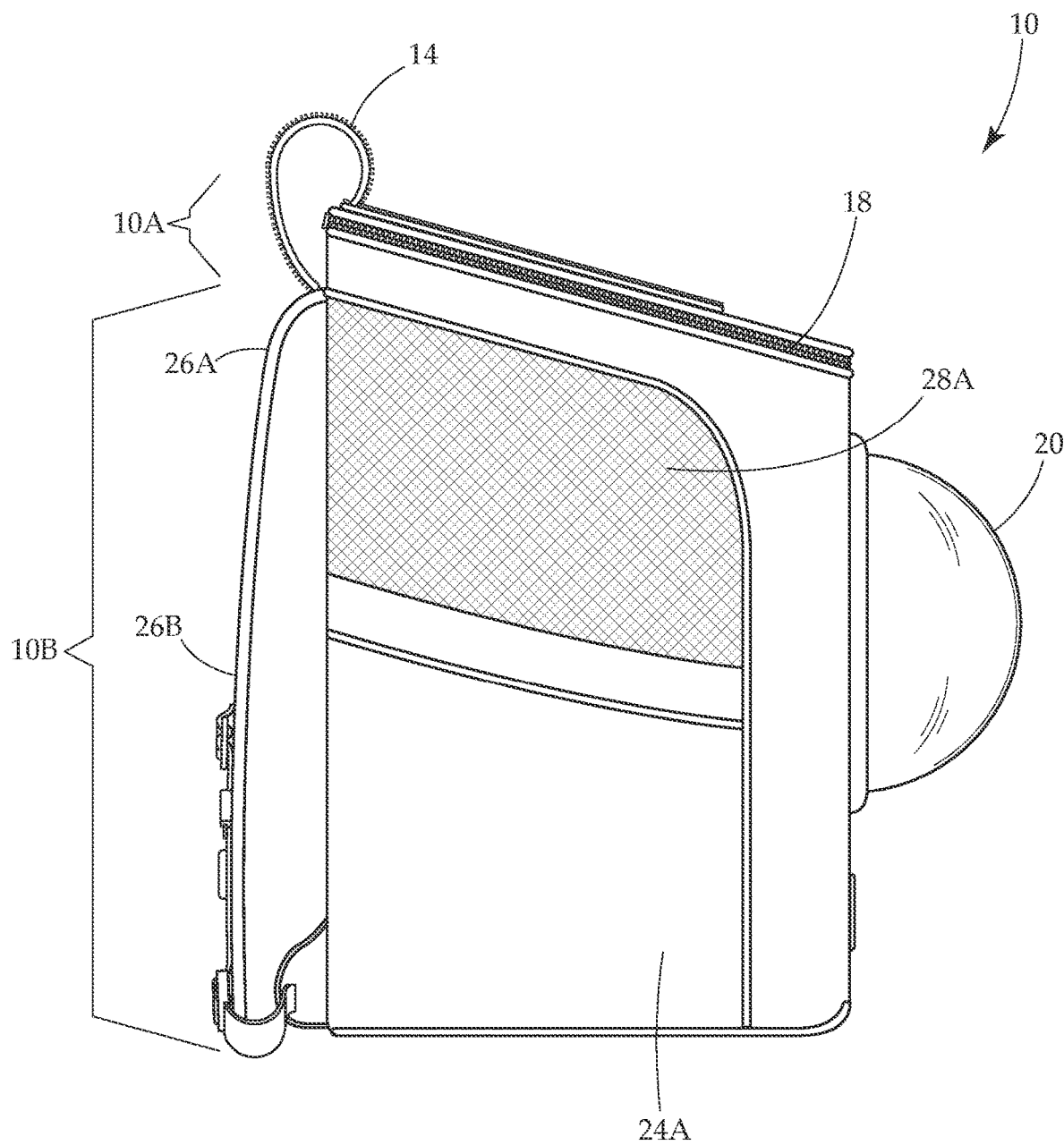
FIG. 3 is a left-hand side view of one embodiment of the present device with a front transparent hemispherical attachment.
Figure 4:
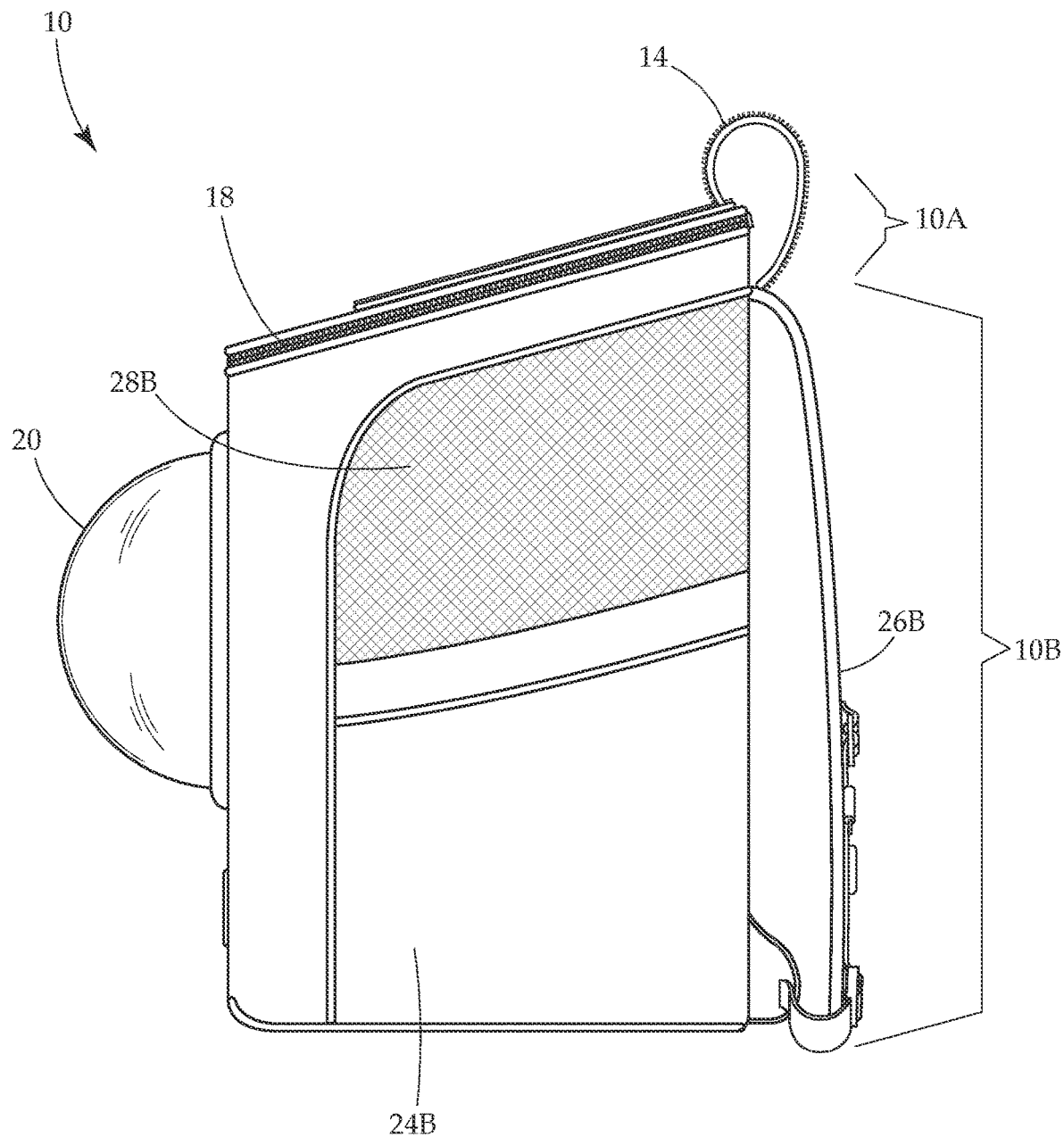
FIG. 4 is a right-hand side view of one embodiment of the present device with a front transparent hemispherical attachment.

FIGS. 3-4 are side views of one embodiment of the pet backpack 10 with a front transparent hemispherical attachment 20 wherein the main body 10b further comprises two mesh side windows 28a and 28b made from sturdy material to allow for additional ventilation. Shoulder straps 26a and 26b are designed to hold up to 25 lbs of pets and they are adjustable to accommodate users of different heights and sizes. In some embodiments, the side pockets 24a and 24b are zipperable which allows users to secure personal items inside.

Figure 5:
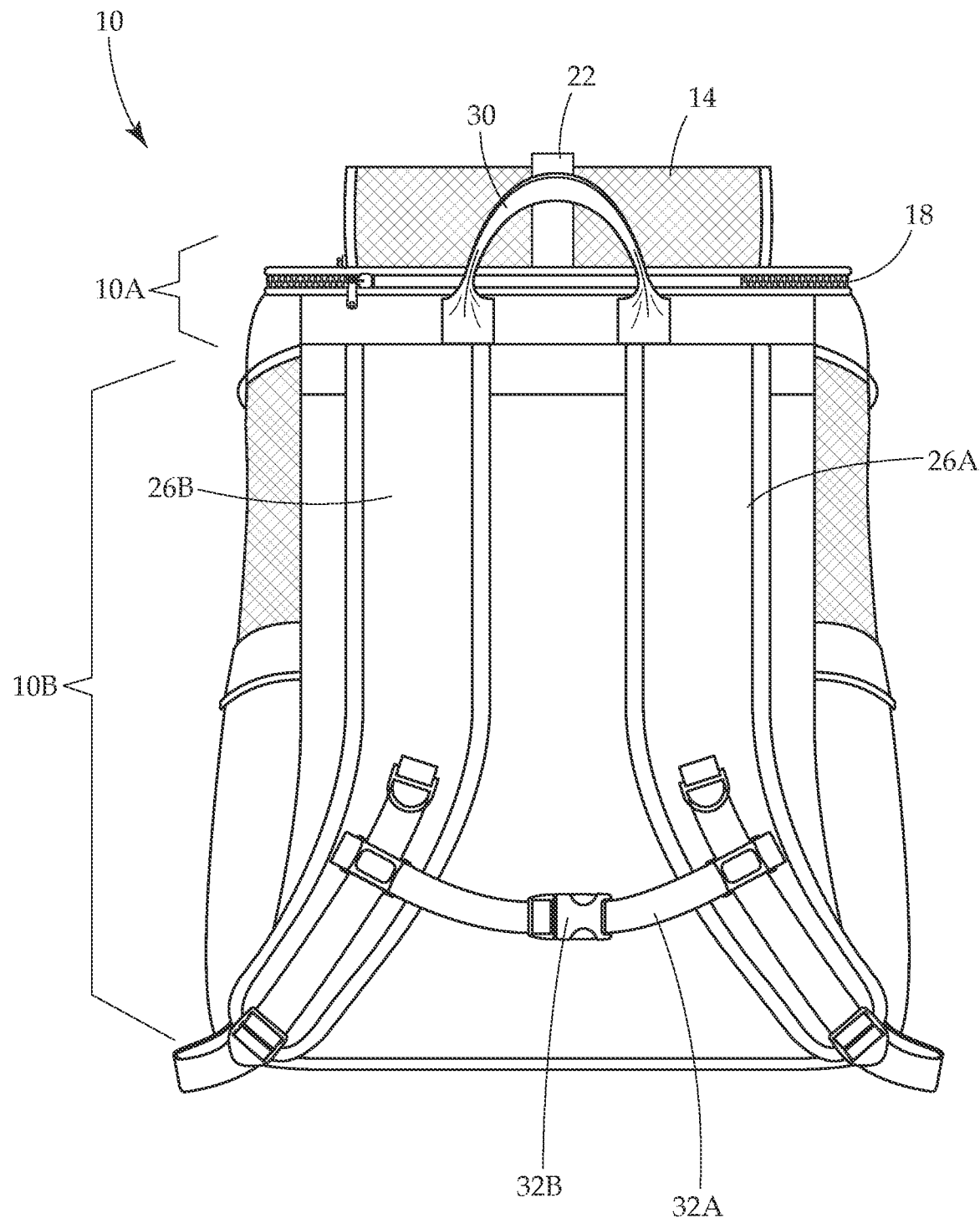
FIG. 5 is a back view of one embodiment of the present device.

FIG. 5 shows the back of the pet backpack 10 which comprises a handle 22 disposed at the top of the main body 10b, a pair of adjustable shoulder straps 26a and 26b, an adjustable chest strap 32a, and a chest strap 32b. The adjustable chest strap 32a and the chest strap 32b are stitched into the shoulder straps 26a and 26b for an enhanced security.

Figure 6:
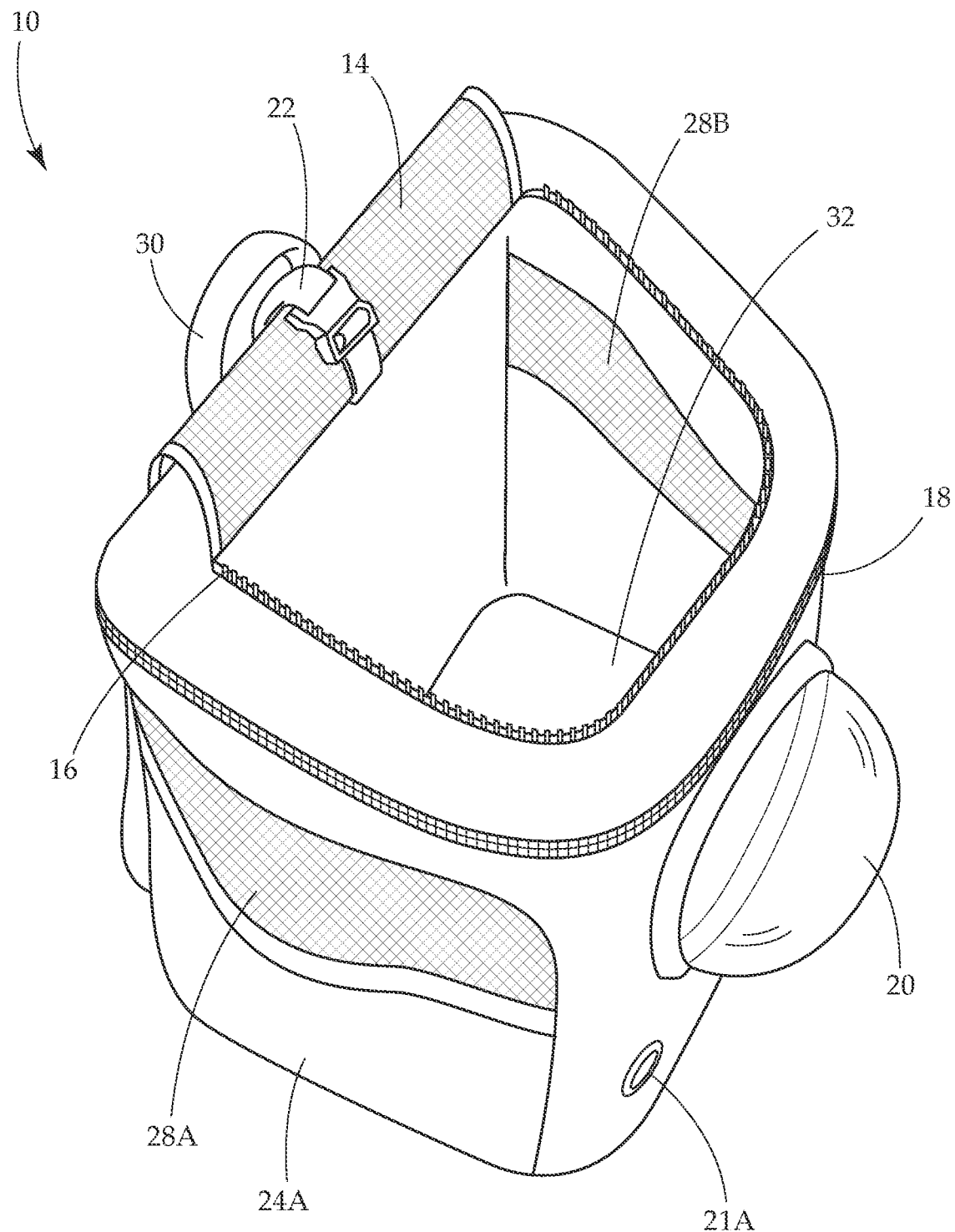
FIG. 6 is a top left perspective view of one embodiment of the present device.

FIG. 6 is a top left perspective view of the pet backpack 10 showing the bottom of the main body 10b. In a preferred embodiment, a removable mat inserts 32 is located at the bottom of the main body 10b to allow a pet to sit more comfortably in the backpack. In some embodiment, the mat also absorbs moist and water.

Figure 7:
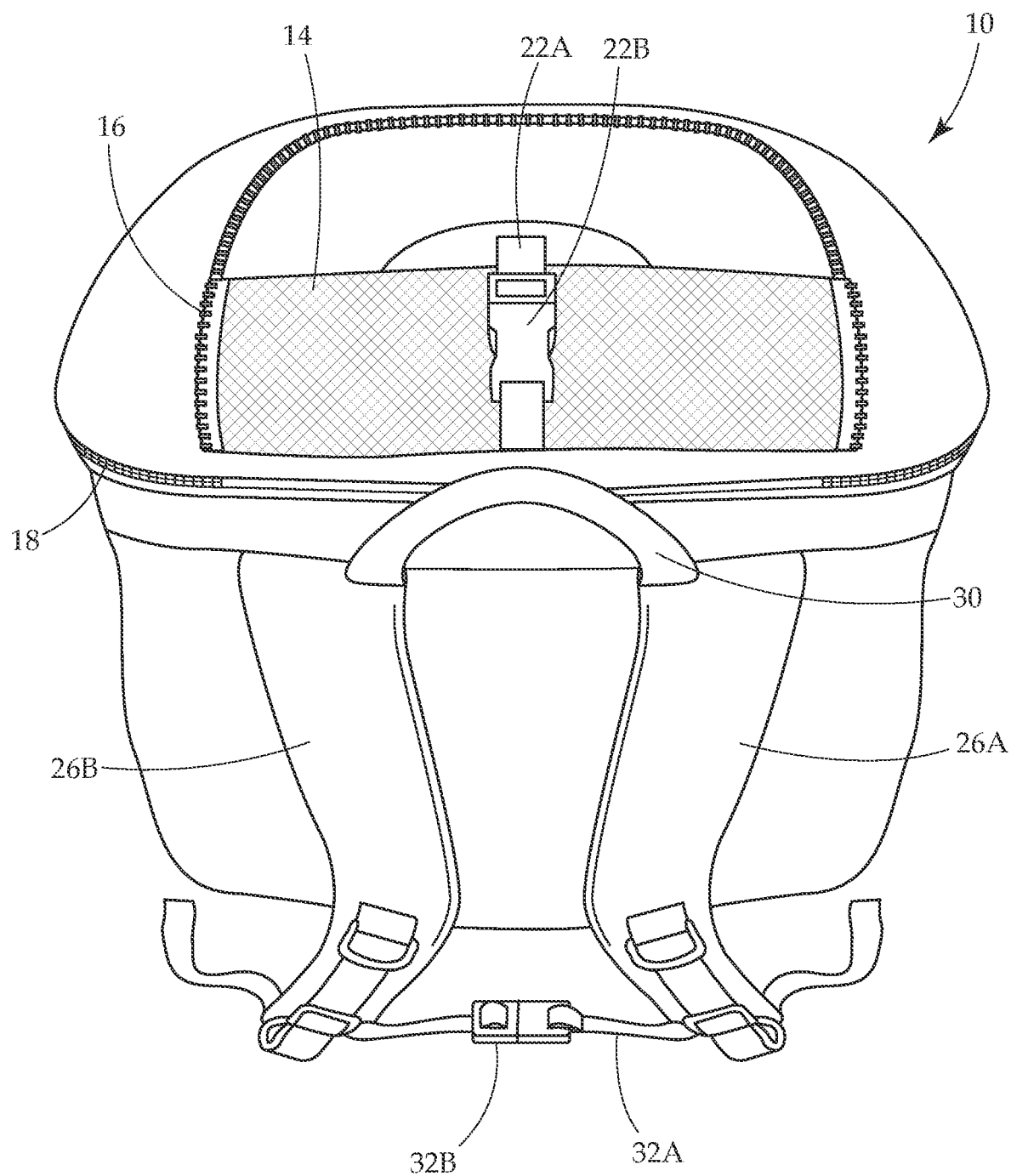
FIG. 7 is a top back perspective view of one embodiment of the present device showing the back straps and securing mechanisms.

FIG. 7 is a top back perspective view of the pet backpack 10 showing the back straps 26a and 26b, a chest strap 32a, and a strap 32b as a securing mechanism. The mesh top 14 is rolled up and buckled up via strap 22a and buckle 22b at the top 10b of the backpack 10.

Figure 8:
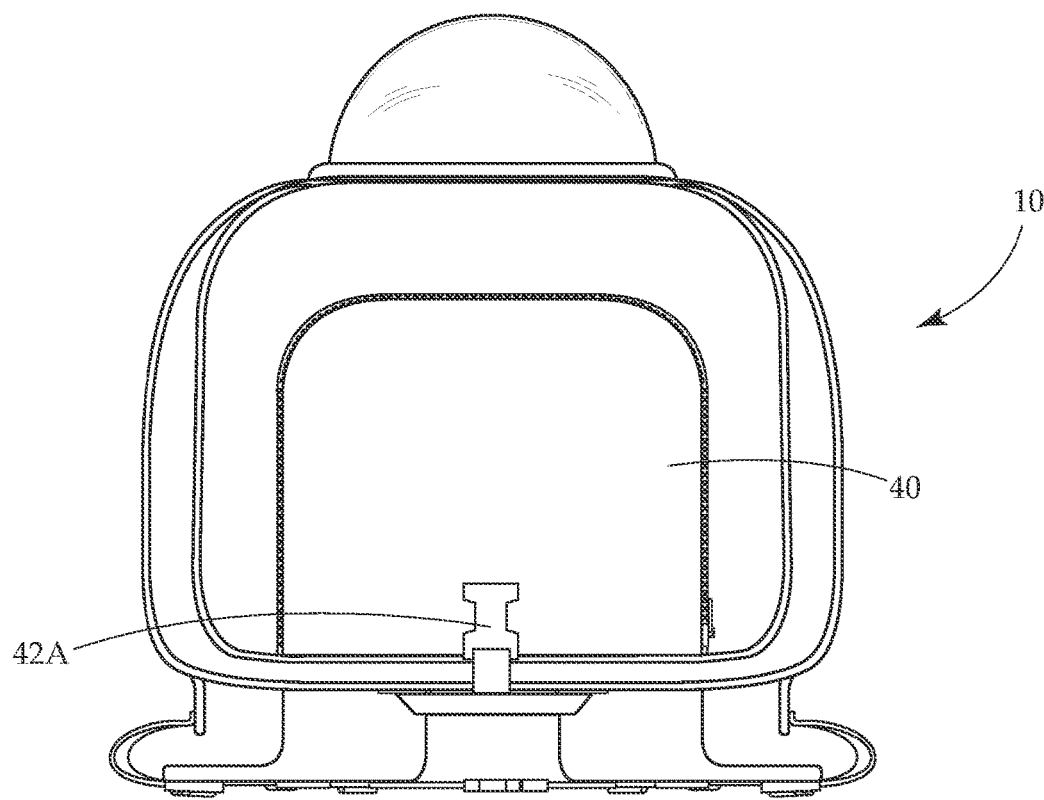
FIG. 8 is a schematic diagram showing a fabric top portion of one embodiment of the present device.

FIG. 8 is a schematic diagram showing a fabric top 40 of one embodiment of the backpack 10. In one embodiment, the zippers meet from end to end to secure the fabric top 40. A fabric loop 42b is attached to the fabric top 40 on one end, wherein a buckle 42a is attached to the other end of the fabric top 40 such that the fabric top 40 can be rolled to provide an opening at the top. In some embodiments, the fabric top 40 is waterproof.

Figure 9:
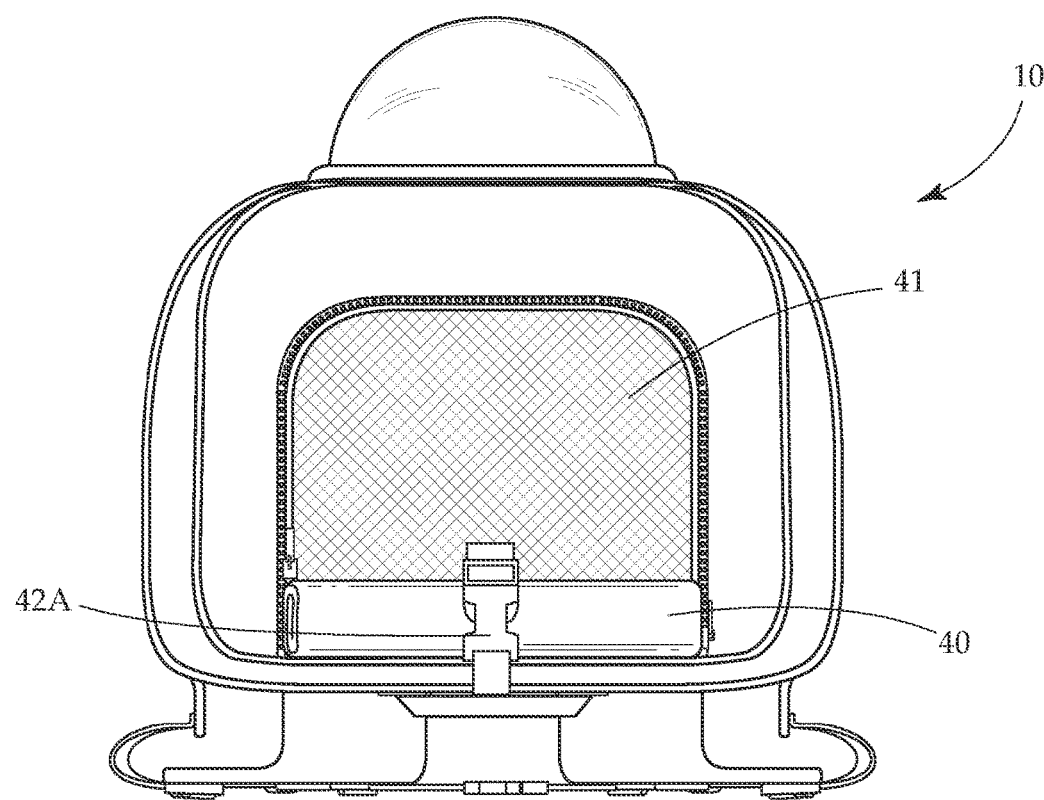
FIG. 9 is a schematic diagram showing a mesh top portion of one embodiment of the present device.

FIG. 9 illustrates one embodiment of the pet backpack 10 wherein the top portion comprises a fabric top 40 and a breathable mesh top 41. A user may roll the fabric top 40 to reveal the mesh top 41 underneath the fabric top 40 which is zipperable.

Figure 10:
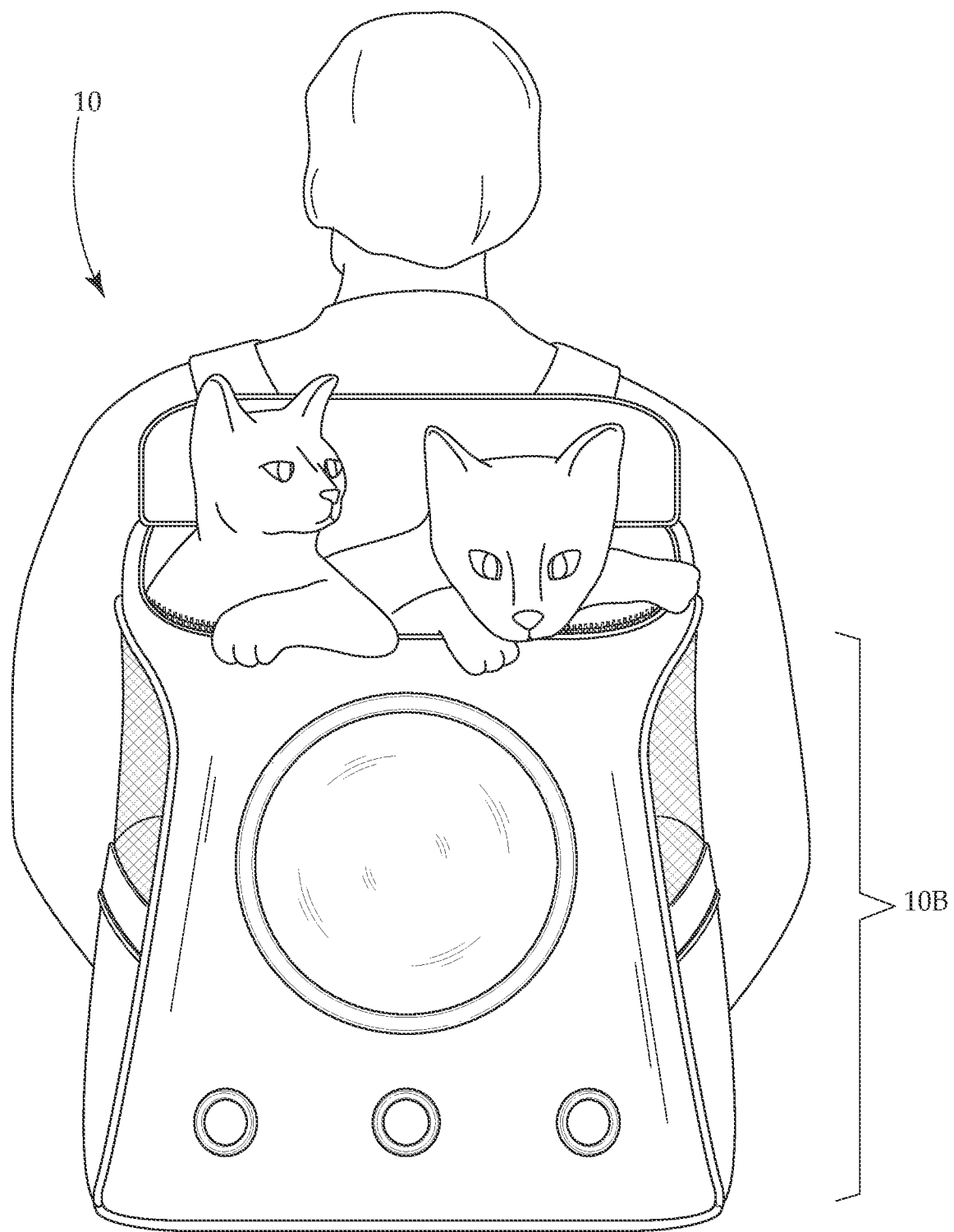
FIG. 10 is a back view of a user wearing a preferred embodiment of the present device with two cats in it.

FIG. 10 shows two cats sitting in the main body 10b of the pet backpack 10, wherein the cats are able to sit up and gain access to fresh air through an opening of the main body 10b.

Figure 11:
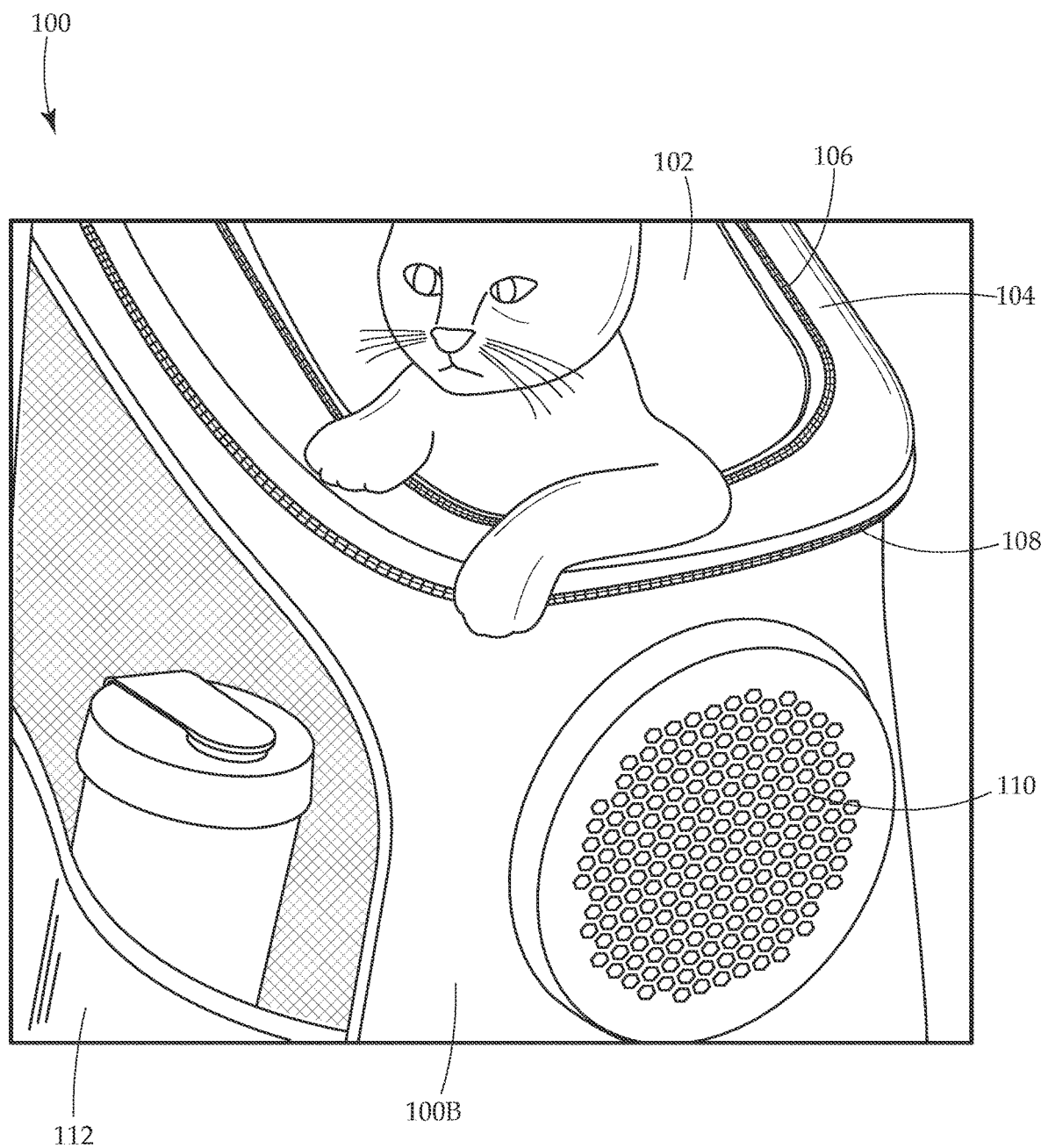
FIG. 11 is a back view of one embodiment with a breathable screen attachment.

In some embodiments as shown in FIG. 11, a pet backpack 100 a main body 100b and a top opening 102, wherein the main body 100b comprises a breathable screen attachment 110 disposed at the front of the main body 100b, a side water bottle pocket 112; and the top opening 102 comprises a series of fabric layer 104, a zipper 106 to close the top opening 102, and a zipper 108 to secure the fabric layer 104.

Figure 12:
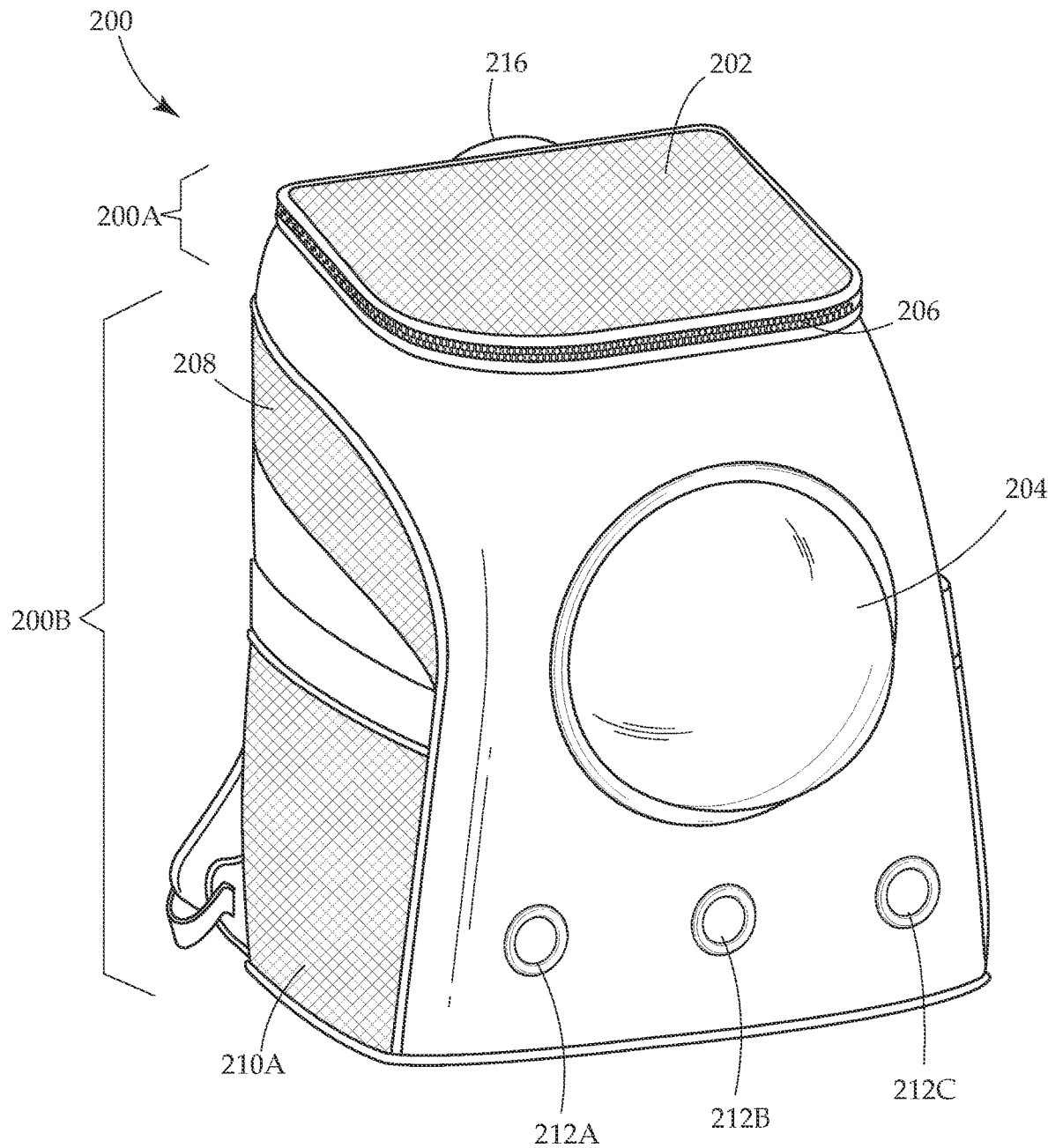
FIG. 12 is a front perspective view of one embodiment with a transparent hemispherical attachment, a number of air holes, and a mash top portion.

FIG. 12 shows another embodiment of a pet backpack 200 with a top 200a and a main body 200b, wherein the top 200a further comprises a breathable mesh top 202, a handle 216, and a zipper 206 to secure the mesh top 202 to the main body 200b; and the main body 200b further comprises a transparent hemispherical attachment 204, a number of side mesh windows 208a and 208b (not shown here), a number of air holes 212a-212c. In some embodiments, the transparent hemispherical attachment 204 can be replaced with a screen attachment for easy transportation or other purposes.

Figure 13:
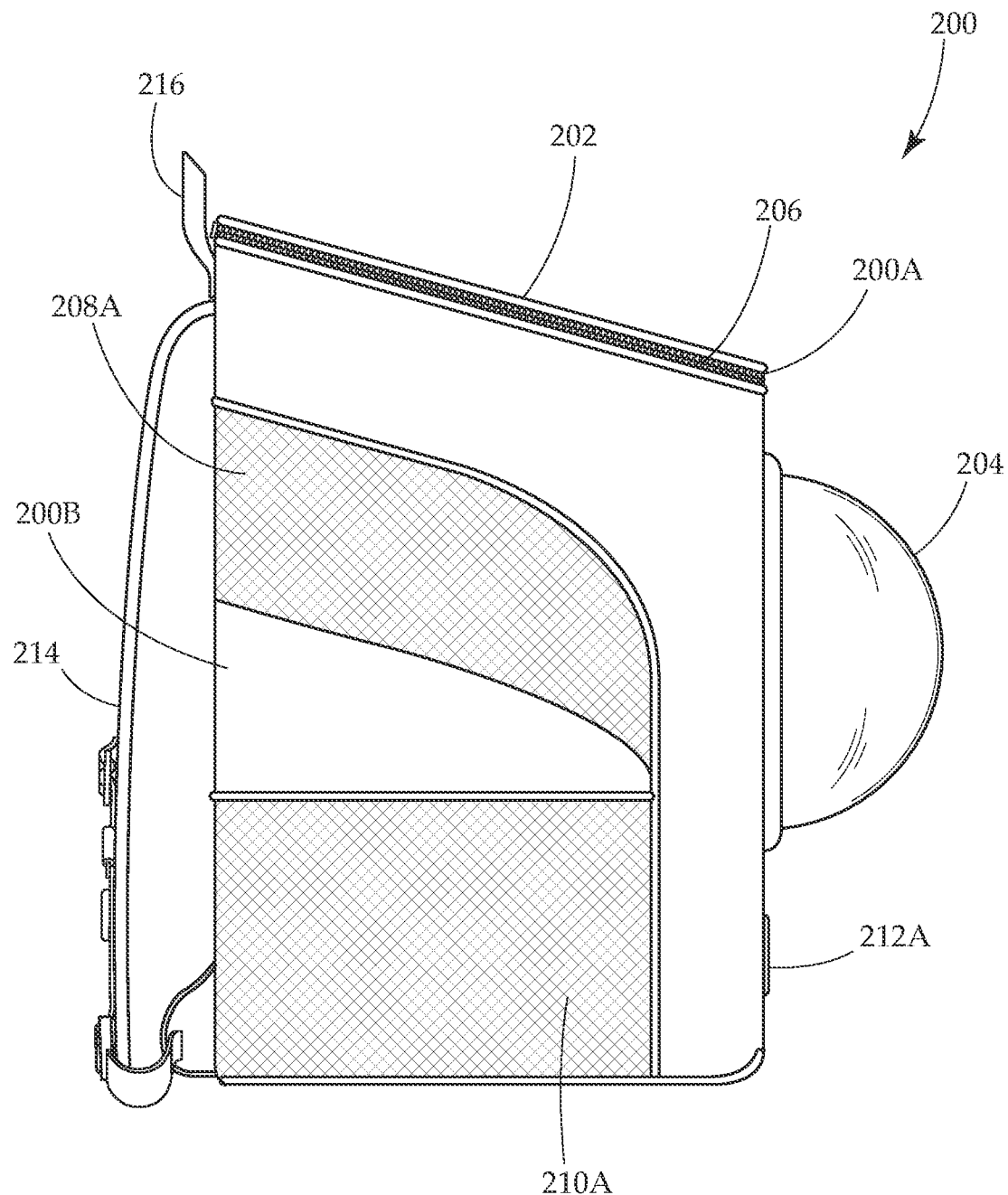
FIG. 13 is a side view of one embodiment of the present device with a transparent hemispherical attachment.

FIG. 13 shows the pet backpack 200 comprising the mesh top 202, a transparent hemispherical attachment 204 disposed at the front of the backpack, a zipper 206, a left-hand side mesh window 208a, a left-hand side mesh pocket 210a, three air holes 212a-212c on the bottom of the backpack, and shoulder strap 214, and a handle 216.

Figure 14:
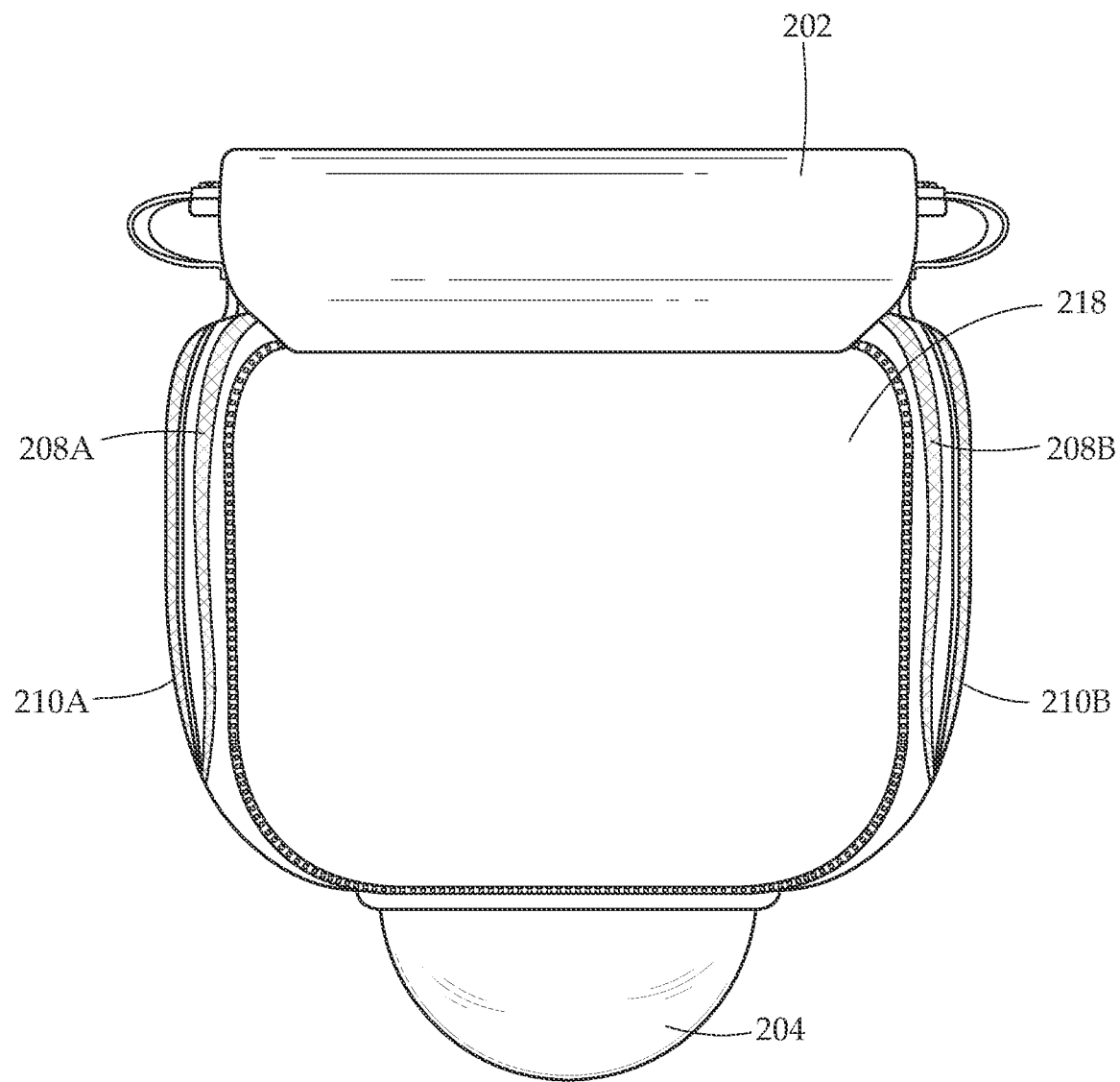
FIG. 14 is a top view of one embodiment of the present device with an unzippered top opening.

FIG. 14 shows a top opening 218, a mesh top 202, a transparent hemispherical attachment 204 disposed at the front of the backpack, two side mesh windows 208a and 208b, two side mesh pockets 210a and 210b, with an unzippered top opening of the pet backpack 200.

Figure 15:
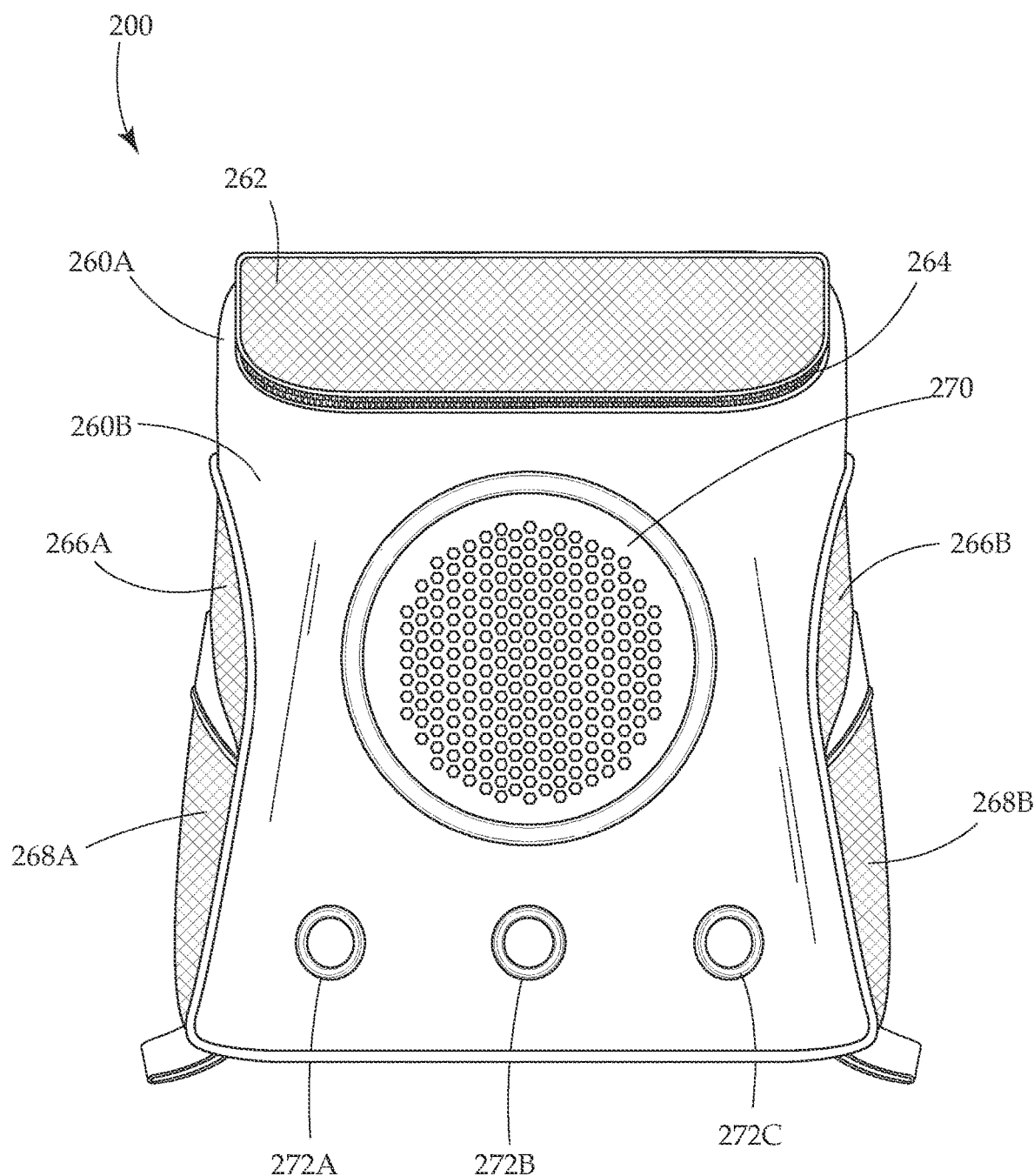
FIG. 15 is a front view of one embodiment of the present device with a breathable screen attachment at the front, a number of air holes, a breathable mesh top, and two side pockets.

FIG. 15 shows a pet backpack 260 comprising a top 260a and a main body 260b, wherein the top 260a further comprises a breathable mesh top 262 and a zipper 264; and wherein the main body 260b further comprises a breathable screen attachment 270 at the front, two side mesh windows 266a and 266b, two side mesh pockets 268a and 268b, and three air holes 272a-272c at the bottom of the main body 260b for ventilation purposes.

Figure 16:
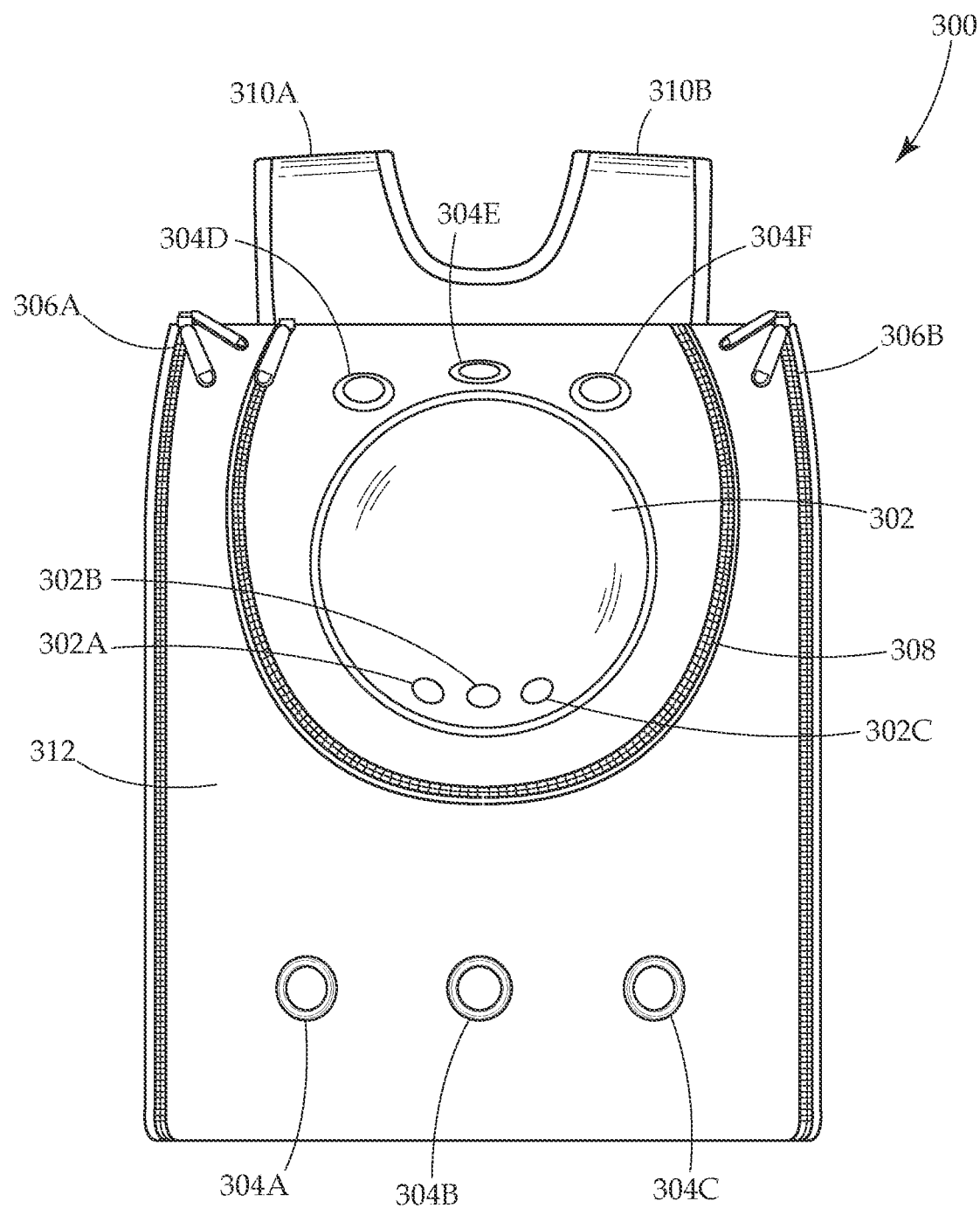
FIG. 16 is a front view of one embodiment of the present device with a number of air holes and a breathable transparent semispherical attachment at the front.

In some embodiments as shown in FIG. 16, a pet backpack 300 comprises three air holes 304a-304c below a transparent semispherical attachment 302, and three air holes 304d-304f above the transparent semispherical attachment 302. Additionally, the transparent semispherical attachment 302 also includes three air holes 302a-302c near the bottom of the attachment.

In another embodiment, the pet backpack 300 further comprises two zippers 306a and 306b located on either side of the backpack, and a zipper 302 which allows a user to pivotably open the semispherical attachment 302 to reveal the cavity of the backpack underneath.

Figure 17:
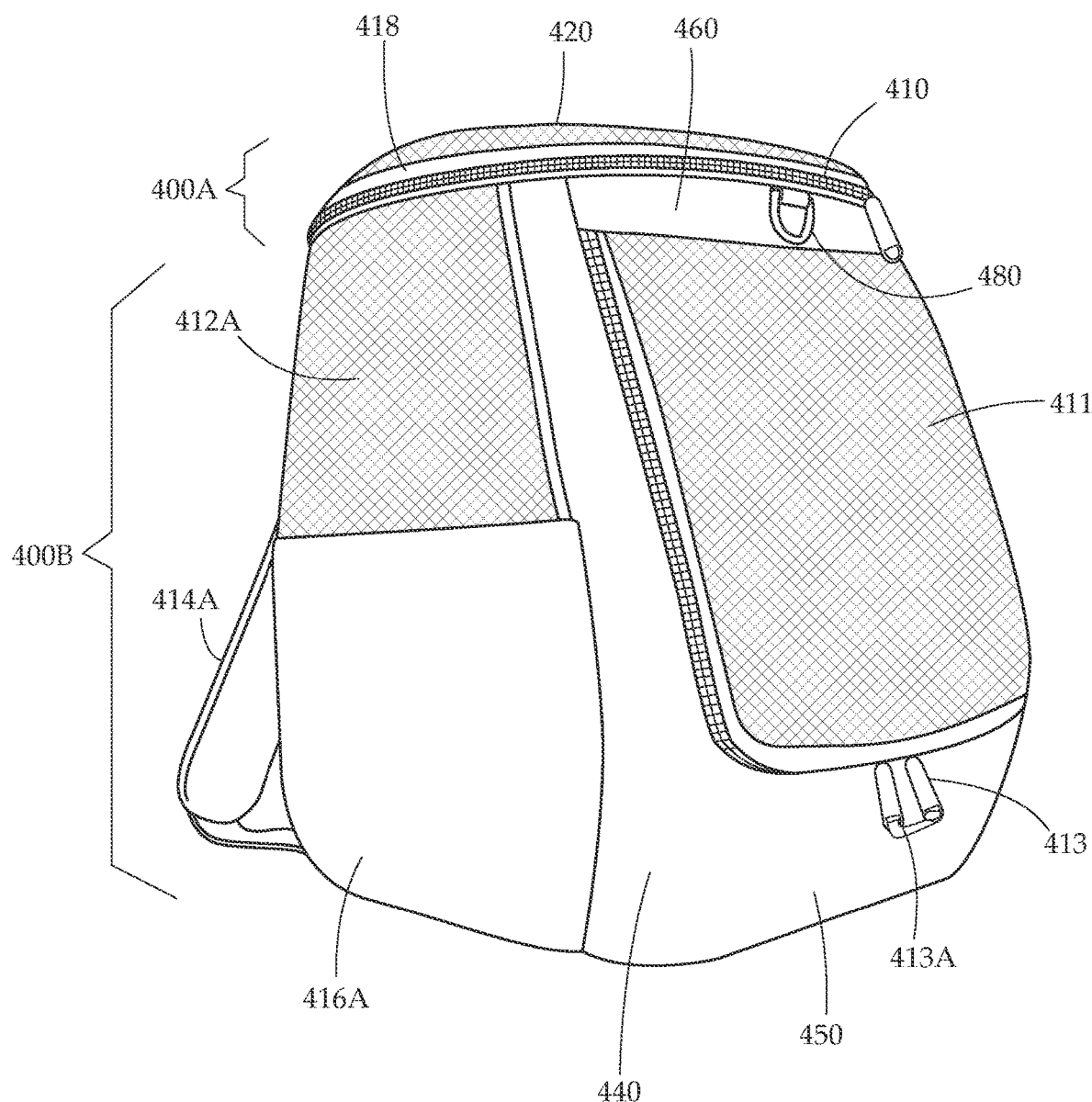
FIG. 17 is a front perspective view of one embodiment of the present device with side mesh windows and a breathable front mesh window secured by zippers.
Figure 18:
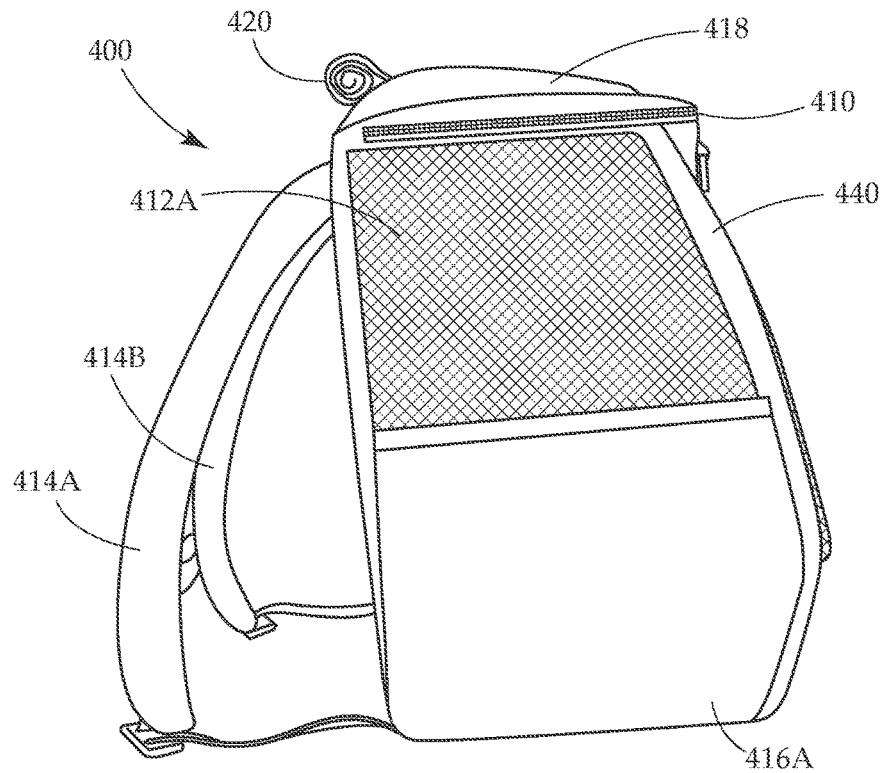
FIG. 18 is a left-hand side view of one embodiment of the present device showing the back straps, rolled mesh top, and a side mesh window.
Figure 19:
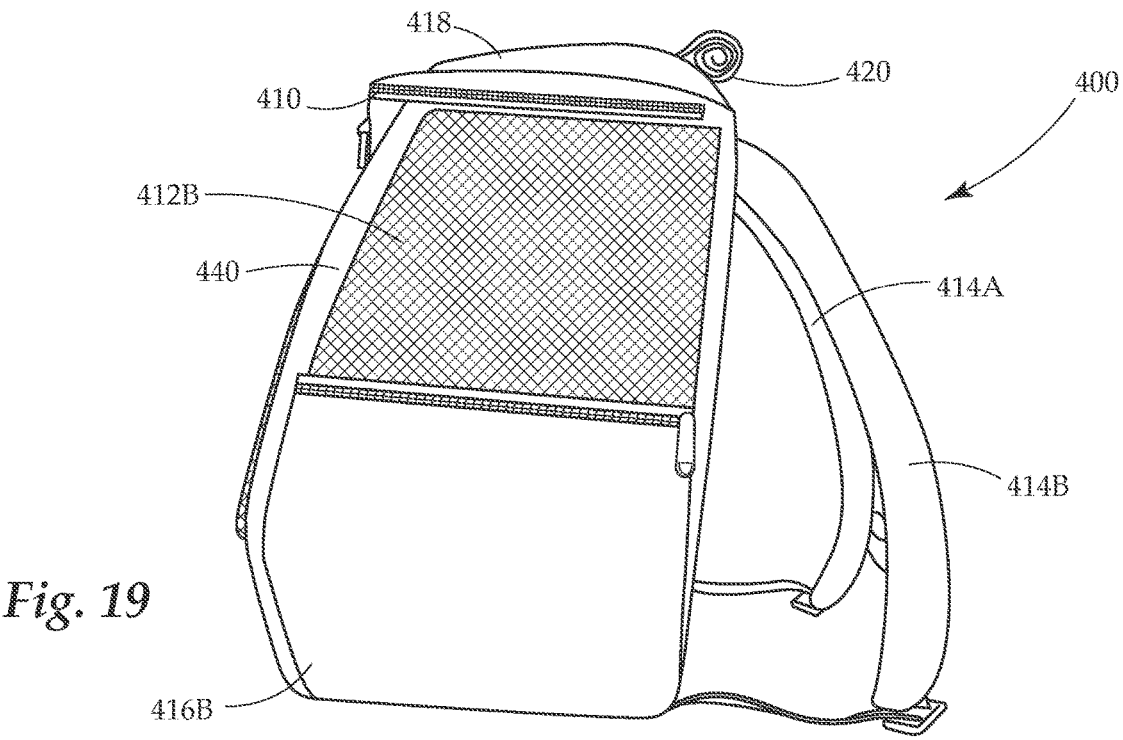
FIG. 19 is a right-hand side view of one embodiment of the present device showing the back straps, rolled mesh top, a side mesh window, and a zippered side pocket.

FIG. 17 is a front perspective view of one embodiment of a pet backpack 400 comprising a top 400a and a main body 400b, wherein the top 400a further comprises a fabric loop 418, a D-ring 480 attached to a zipper 410, a mesh top 420, and a fabric top 418; and wherein the main body 400b further comprises a front mesh window 411 disposed in between a lower front 450 and a top front 460, two side mesh window 412a and 412b (not shown), two shoulder straps 414a and 414b (not shown), two side pockets 416a and 416b (not shown), and a front zipper 412 with a zipper clip 412a. The front mesh window 411 can be rolled up to provide a large opening FIGS. 18 and 19 are side views of the pet backpack 400, wherein the mesh top 420 is rolled-up to provide a top opening to the interior of the backpack. In one embodiment, the backpack 400 includes a zippered pouch 416b on one side and a pair of side pockets 416a on the other side.

Figure 20:
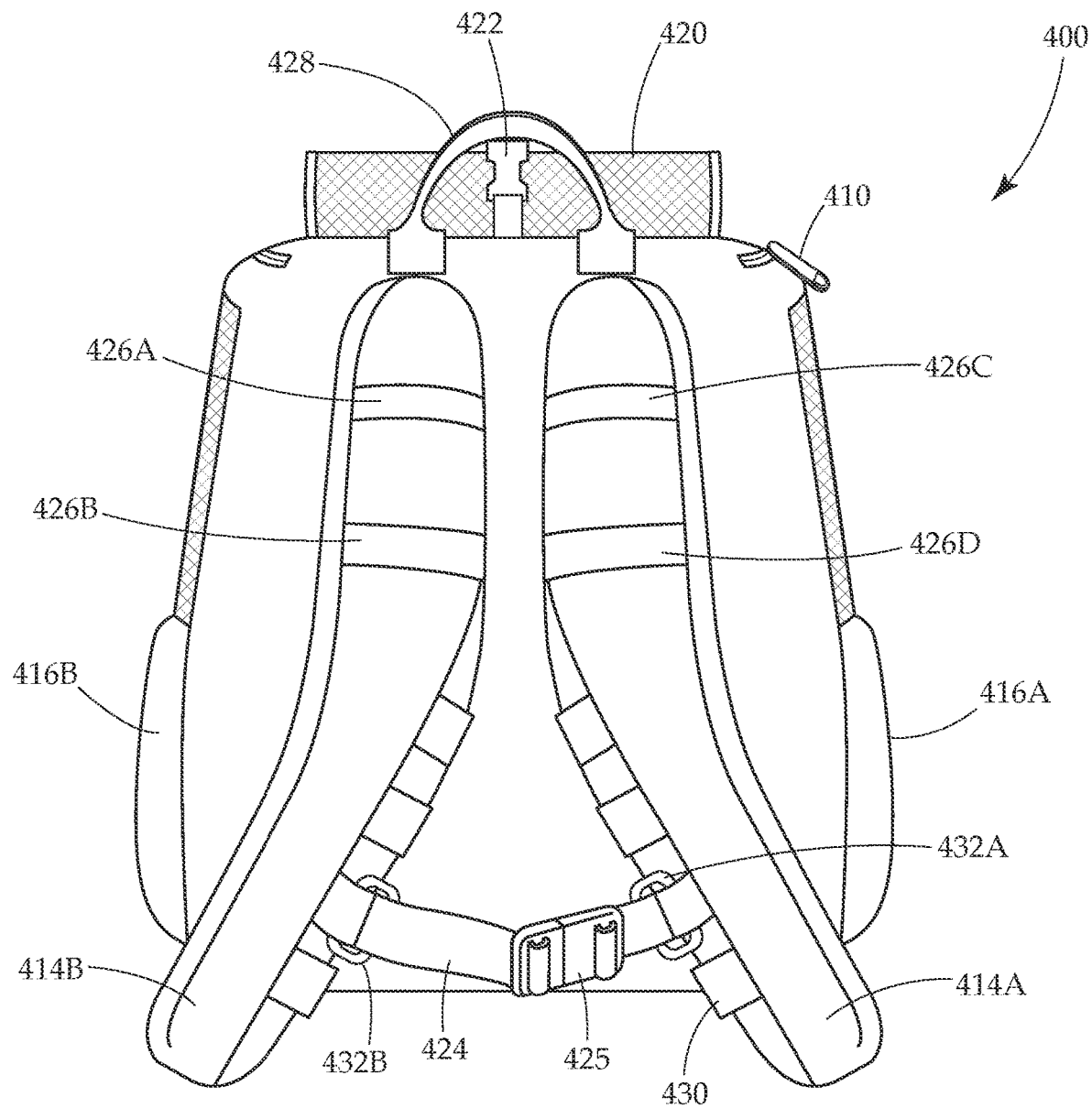
FIG. 20 is a back view of one embodiment of the present device showing the shoulder straps, the chest straps, and adjustable fabric loops.

FIG. 20 is a back view of the pet backpack 400 showing a side pocket 416a, a zippered side pocket 416b, shoulder straps 414a and 414b, the fabric chest straps 424 with a chest buckle 425 and buckle clips 432a and 432b, adjustable fabric loops 430 located on the side of the shoulder straps 414a and 414b. The shoulder straps 414a and 414b further comprises shoulder straps lower portions 426a-426d.

Figure 21:
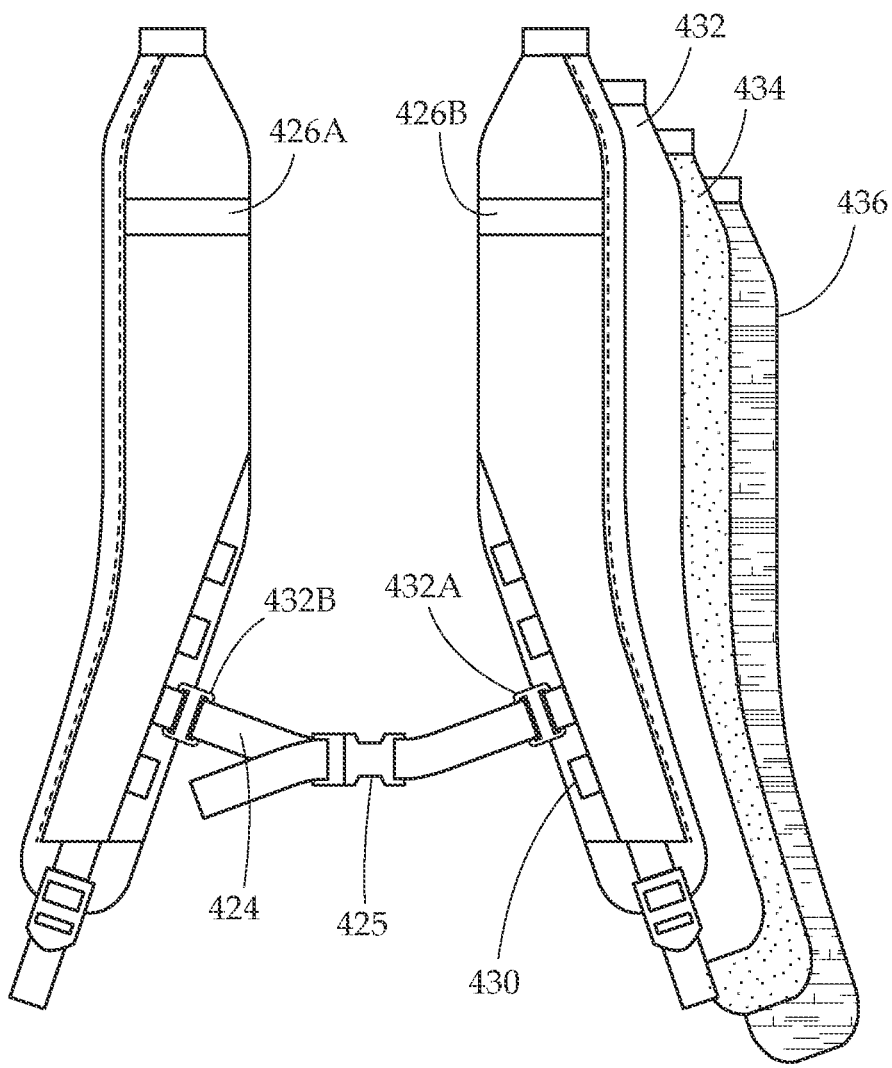
FIG. 21 is a schematic diagram showing a number of layers of the shoulder straps.

FIG. 21 is a schematic diagram showing a layer of foam beneath the surface of the strap 432, followed by another supporting layer 434, followed by a sturdy woven fabric 436 in order to provide support on the shoulder straps. In addition, in some embodiments, fabric loops 430 are attached to the inner side of the straps, which allows a user to adjust the height of the buckle clips 432a and 432b for the tightness of the chest buckle 425.

Figure 22:
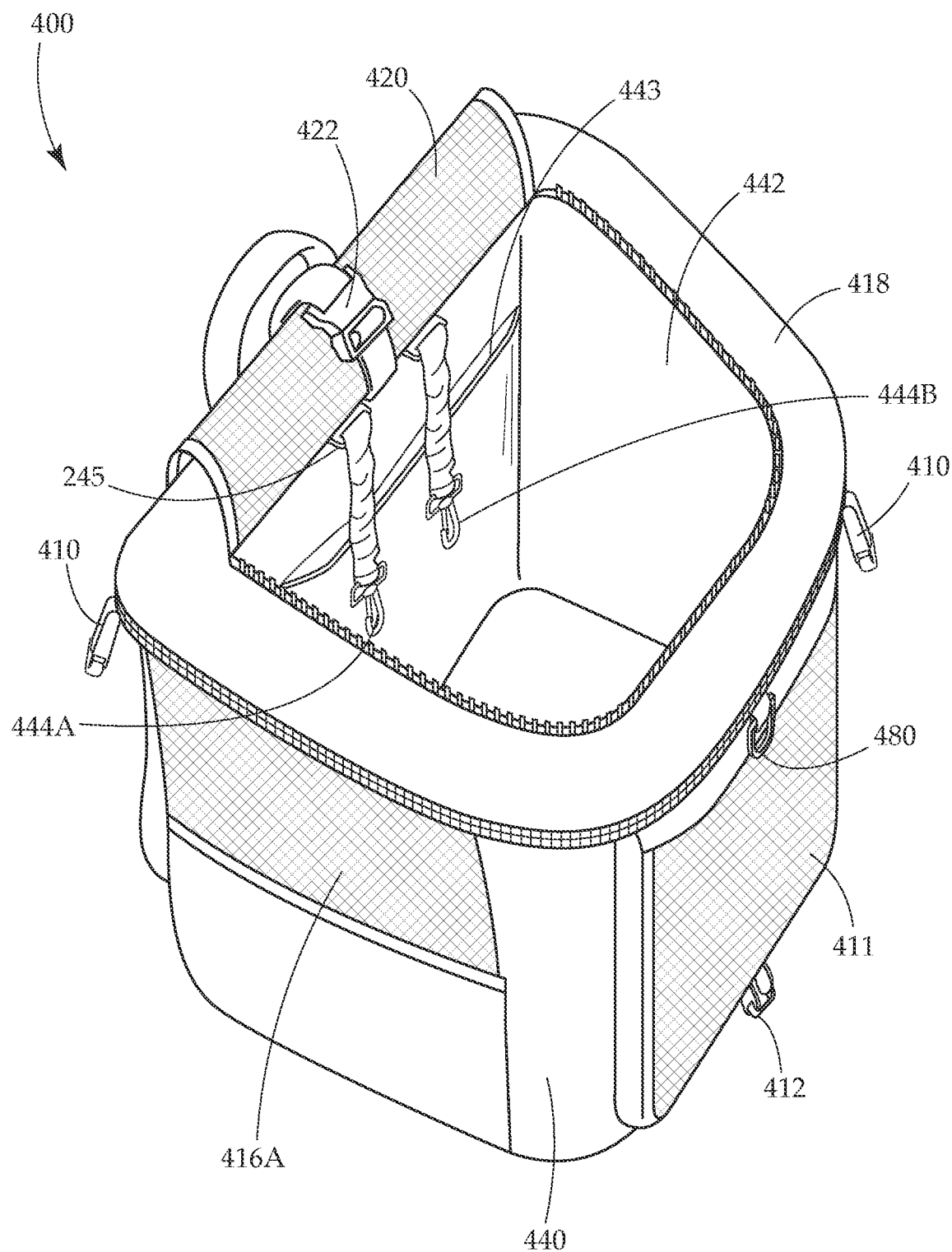
FIG. 22 is a top perspective view of one embodiment of the present device showing the details of the inside with a rolled-up mesh top and breathable front and side mesh windows.

FIG. 22 is a top perspective view the pet backpack 400 showing the details of the inside with a rolled-up mesh top 420 and breathable front window 411 and two side mesh windows 416a and 416b. Two hooks 444a and 444b are attached to the top opening 442 near the buckle 422. In addition, an inside pocket 413 is also located in the interior of the pet backpack 400. A D-ring 480 is attached near zipper 410.

Figure 23:
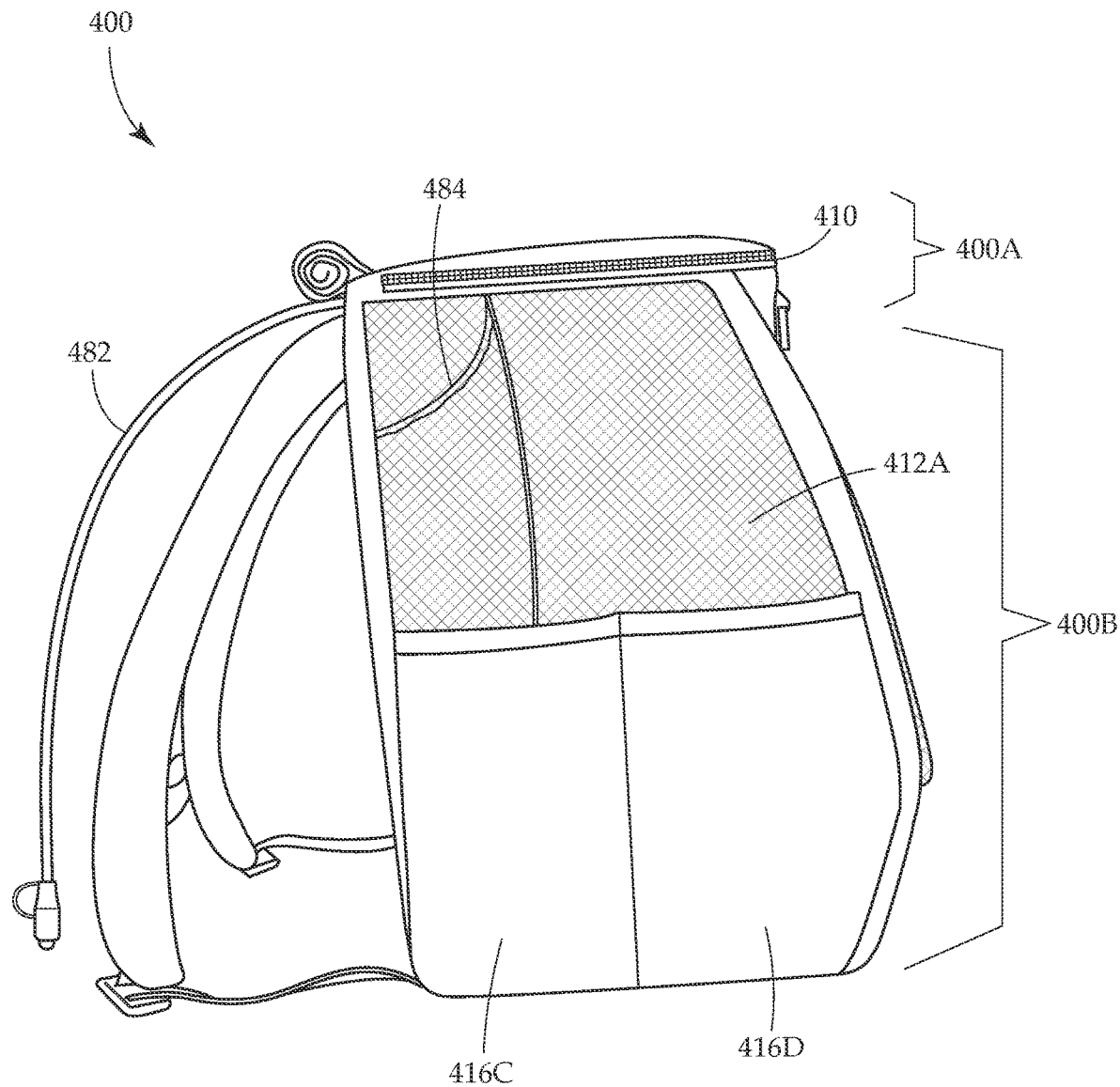
FIG. 23 is a left-hand side view of one embodiment of the present device with a water supply kit, rolled-up mesh top, a breathable side mesh window, and two side pockets.

In one embodiment as shown in FIG. 23, the pet backpack 400 further comprises a water supply kit 482 which passes through the top of the backpack 400 into a water reservoir pocket 484. The water reservoir pocket 484 is designed to keep water insulated at a comfortable temperature and it also includes a layer on to of it to demonstrate the total pocket volume.

Figure 24:
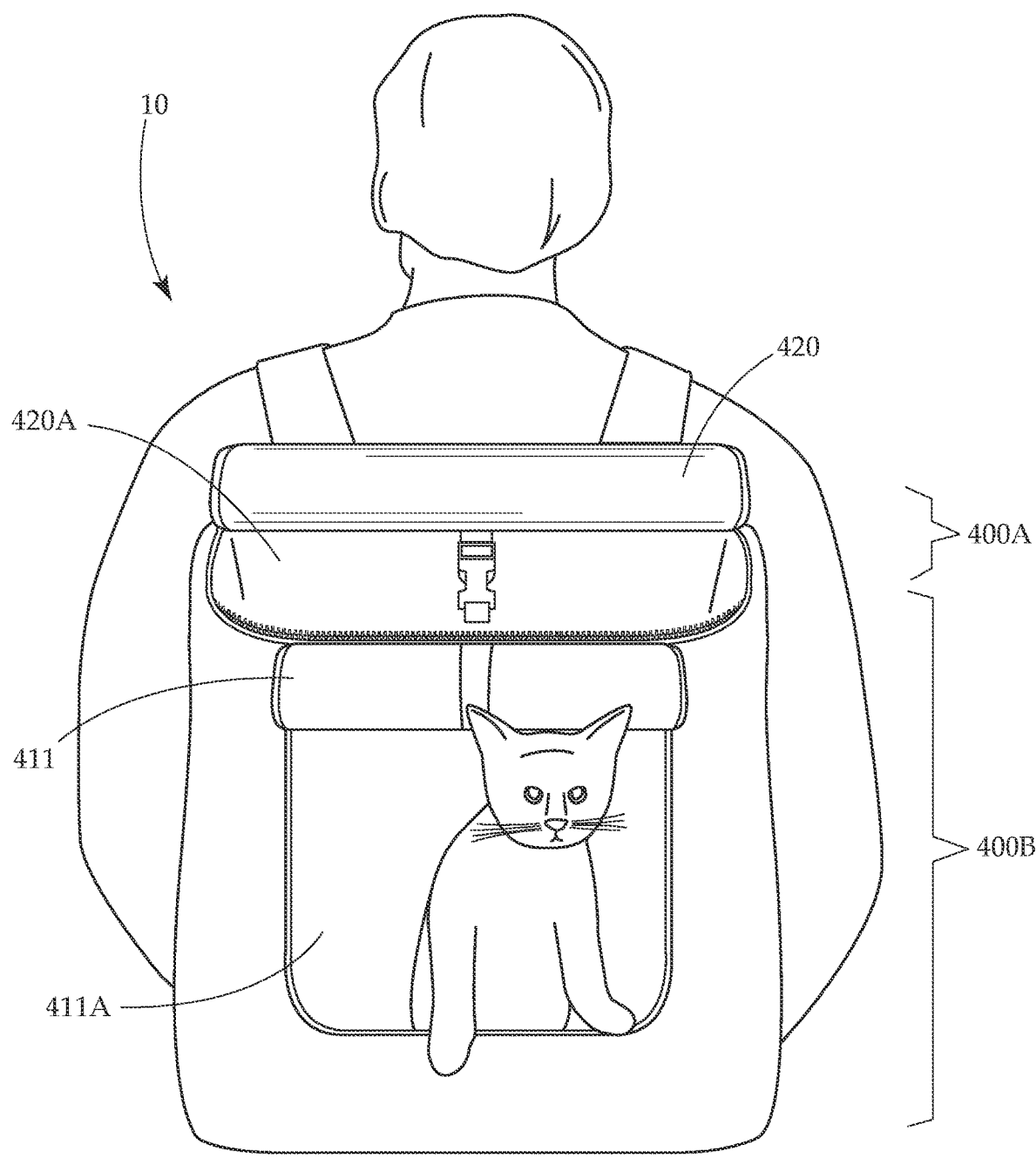
FIG. 24 is a back view of a user wearing one embodiment of the present device with rolled-up top and front mesh windows.

FIG. 24 shows a back view of a user wearing the pet backpack 400 with both the mesh top 420 and the front mesh window 411 in an open position.

Figure 25:
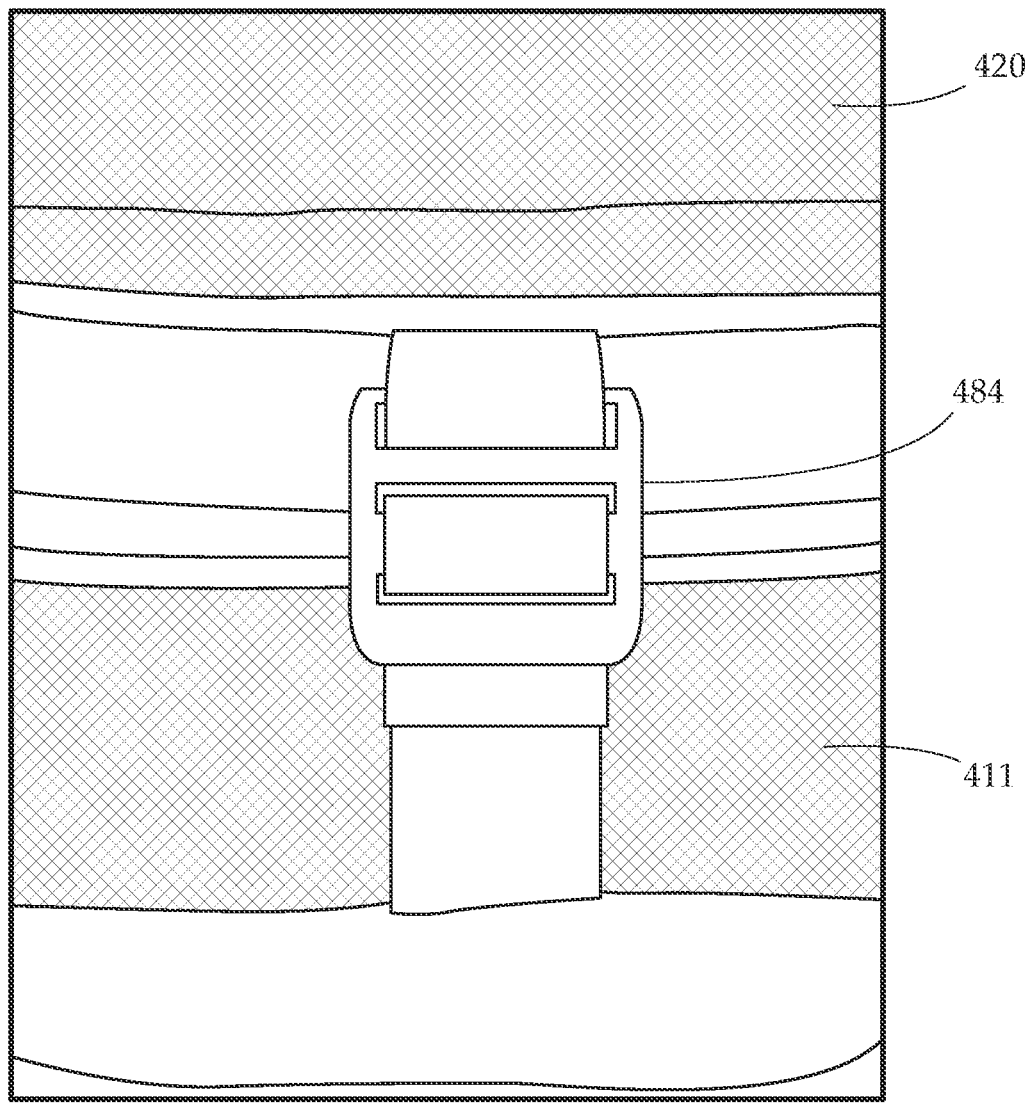
FIG. 25 is a perspective view of a rolled-up front mesh window secured by a front buckle mechanism in one embodiment of the present device.

In FIG. 25, a front buckle 485 is utilized to secure the front mesh window 411 and the front buckle 485 is attached near the mesh top 420.

Figure 26:
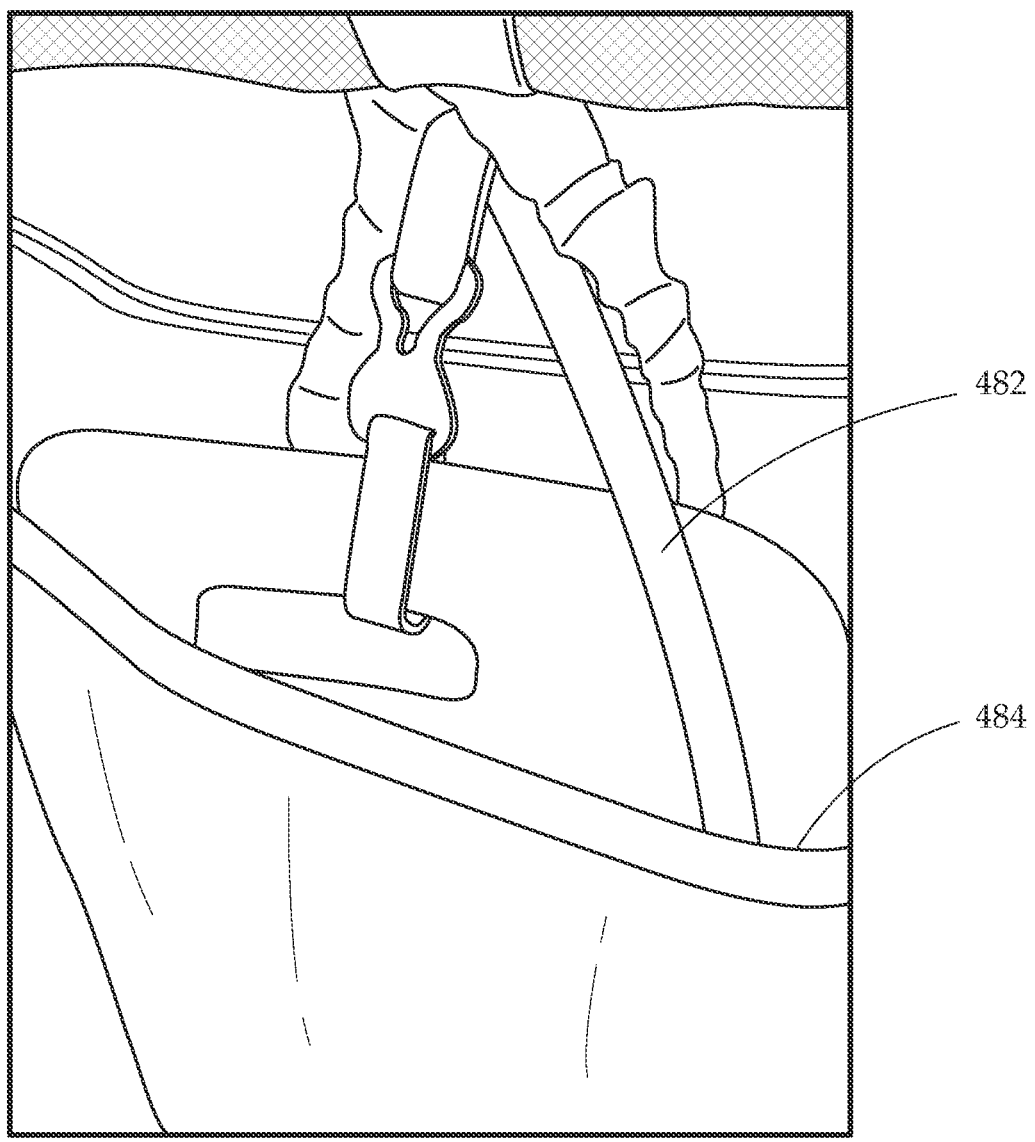
FIG. 26 is a perspective view showing the inside pocket and the water supply kit in one embodiment of the present device.

In one embodiment as shown in FIG. 26, an interior of the pet backpack 400 includes the buckle 445, wherein the buckle 445 can be used to secure a water pouch or other personal items inside the backpack. The water reservoir pocket 484 is designed to keep water insulated at a comfortable temperature and prevent pets from getting tangled with the water supply kit 482.

Figure 27:
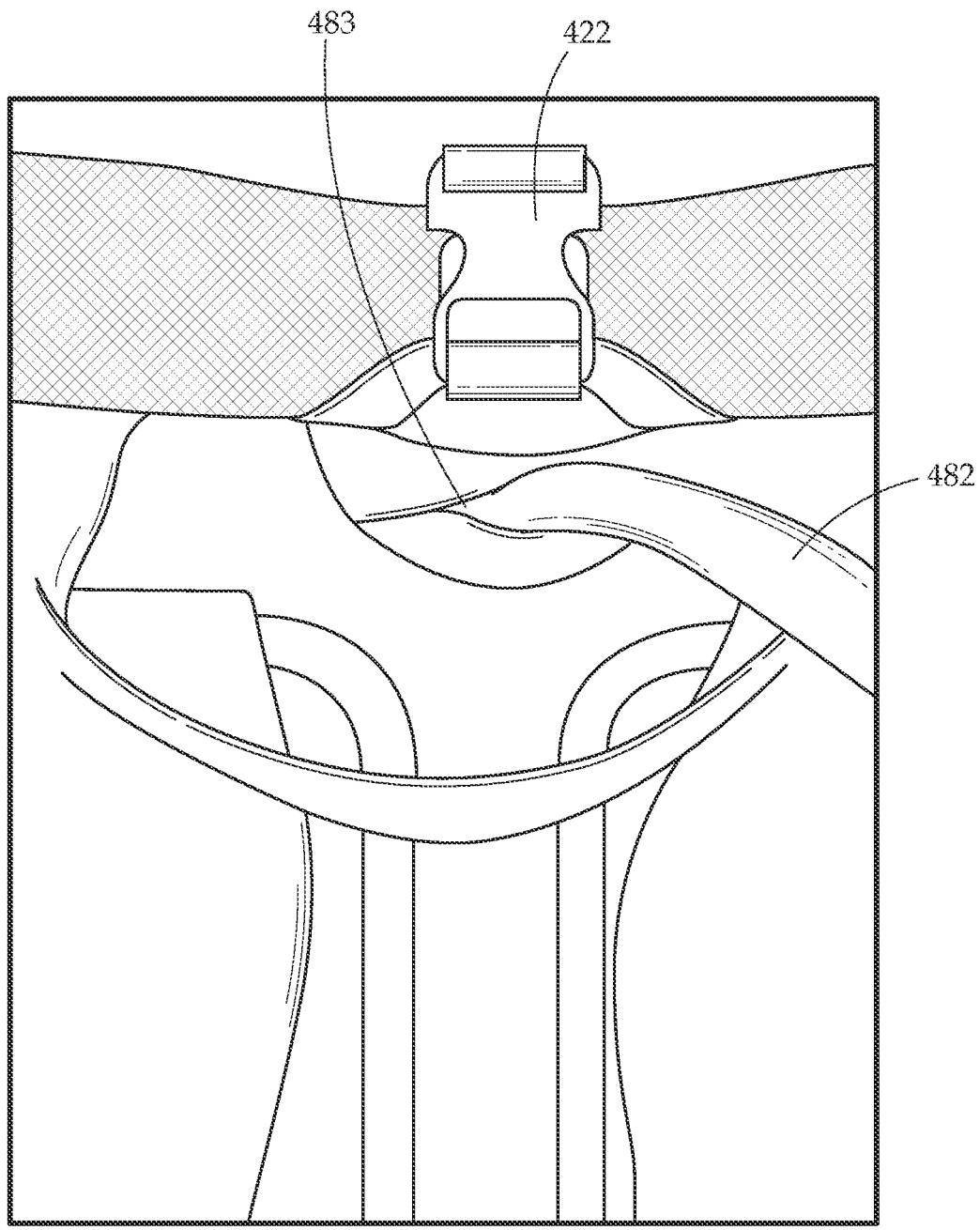
FIG. 27 is a perspective view showing the top portion on the back of one embodiment of the present device with a water supply hole and the water supply kit.

FIG. 27 shows a water supply hole next to the buckle 422 at the top portion on the back of the pet backpack 400 to allow the water supply kit 482 to pass through.

Figure 28:
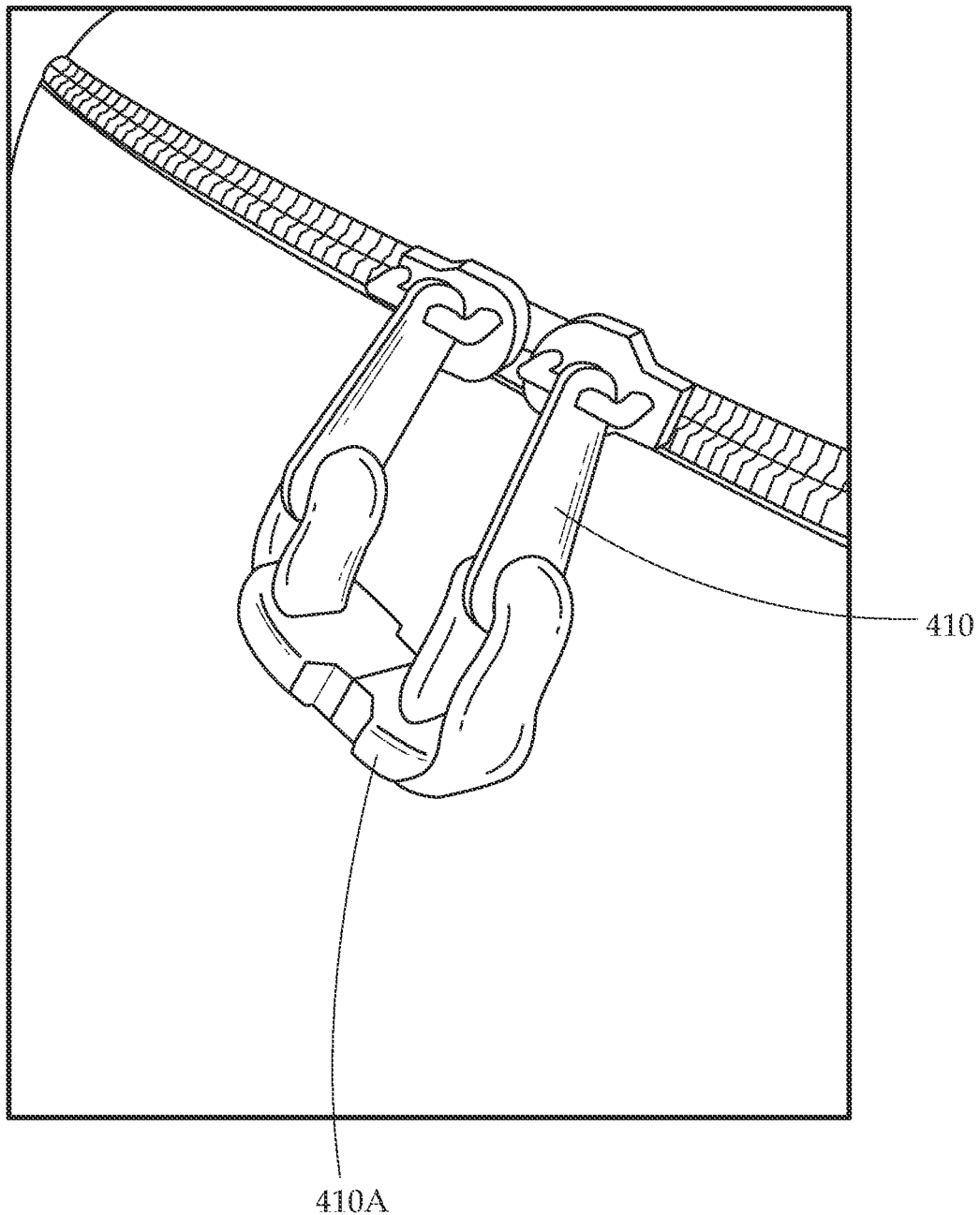
FIG. 28 is a perspective view of one embodiment of the present device showing a zipper clip.

FIG. 28 shows a zipper clip 410a attached to the tip of zipper 410 to prevent the mesh windows from being opened accidentally.

Figure 29:
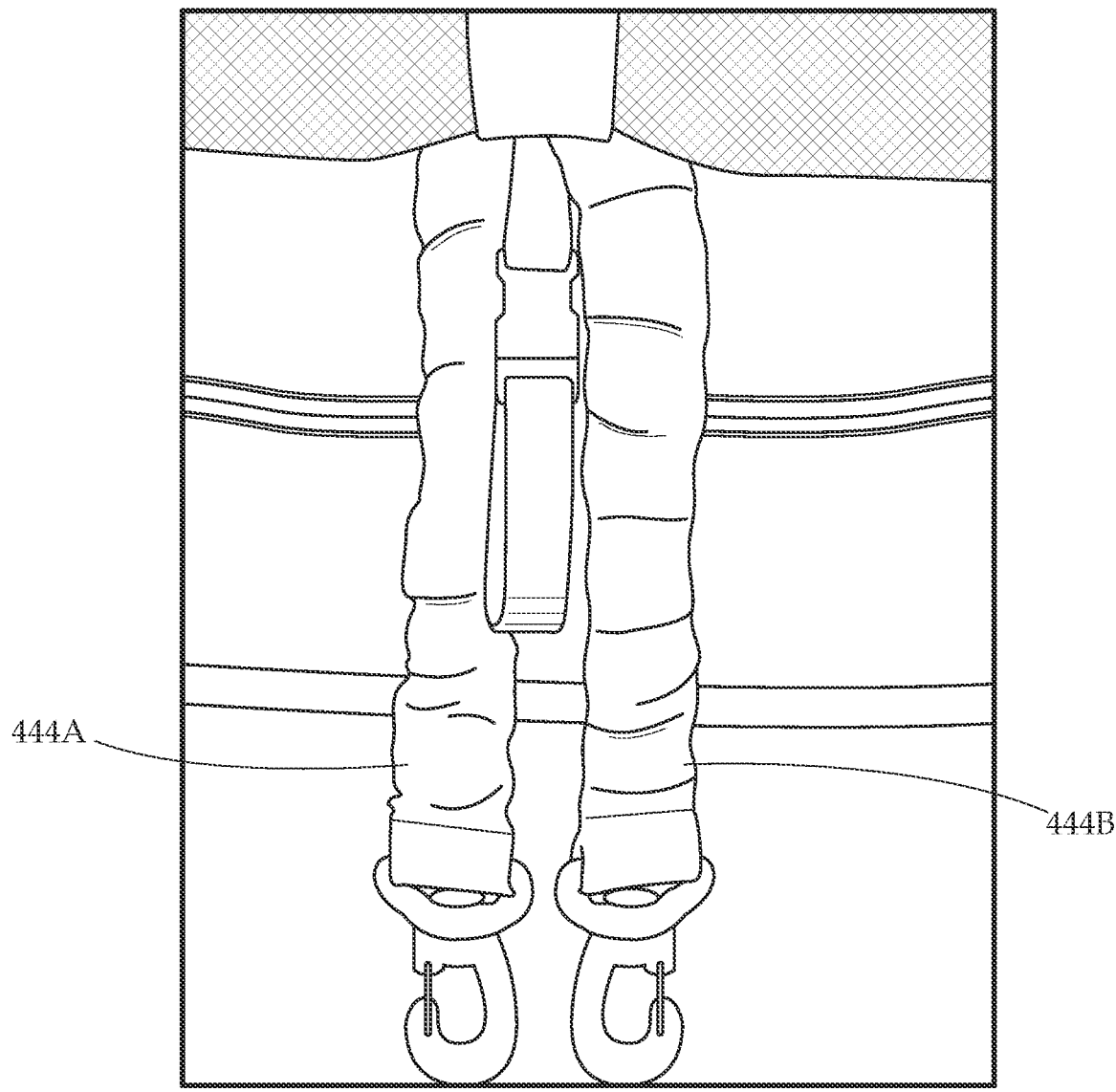
FIG. 29 is a perspective view showing the hooks inside one embodiment of the present device.

FIG. 29 shows the snap hooks 444a and 444b inside one embodiment of the pet backpack attached to a buckle clip 444c. The snap hooks are designed for retaining personal articles such as keys and can also be used to connect the harness to a pet.

Figure 30:
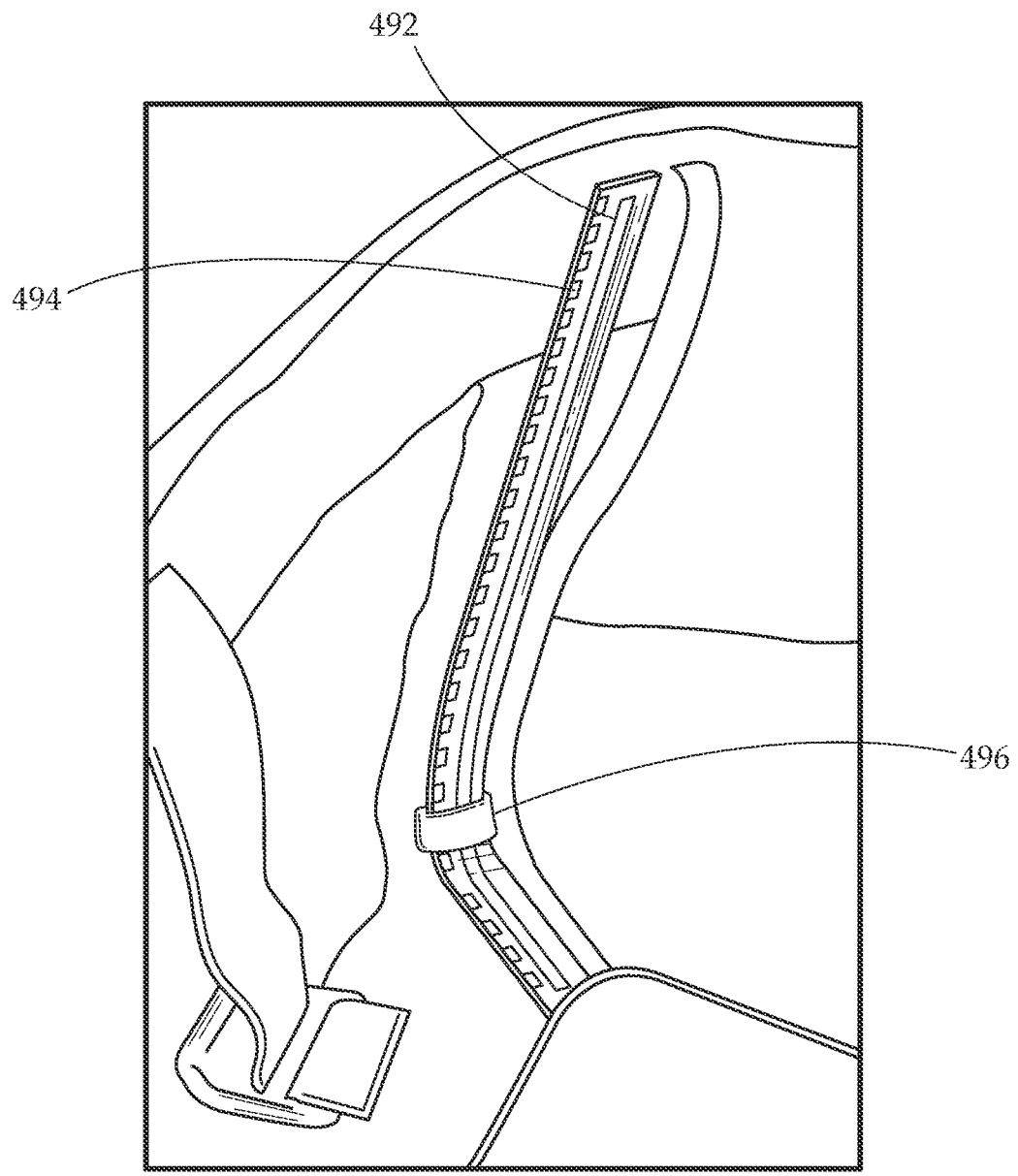
FIG. 30 is a schematic diagram showing the internal rod, the fabric liner and the fabric sleeve of one embodiment of the present device.

FIG. 30 is a schematic diagram showing the inside of the pet backpack 400, which includes an internal rod 492, which could be composed of plastic, steel carbon fiber or any number of composite materials. The internal rod 492 is covered by a fabric liner 494, and secured with a fabric sleeve 496 to protect the pet from being poked within the backpack.

Figure 31:
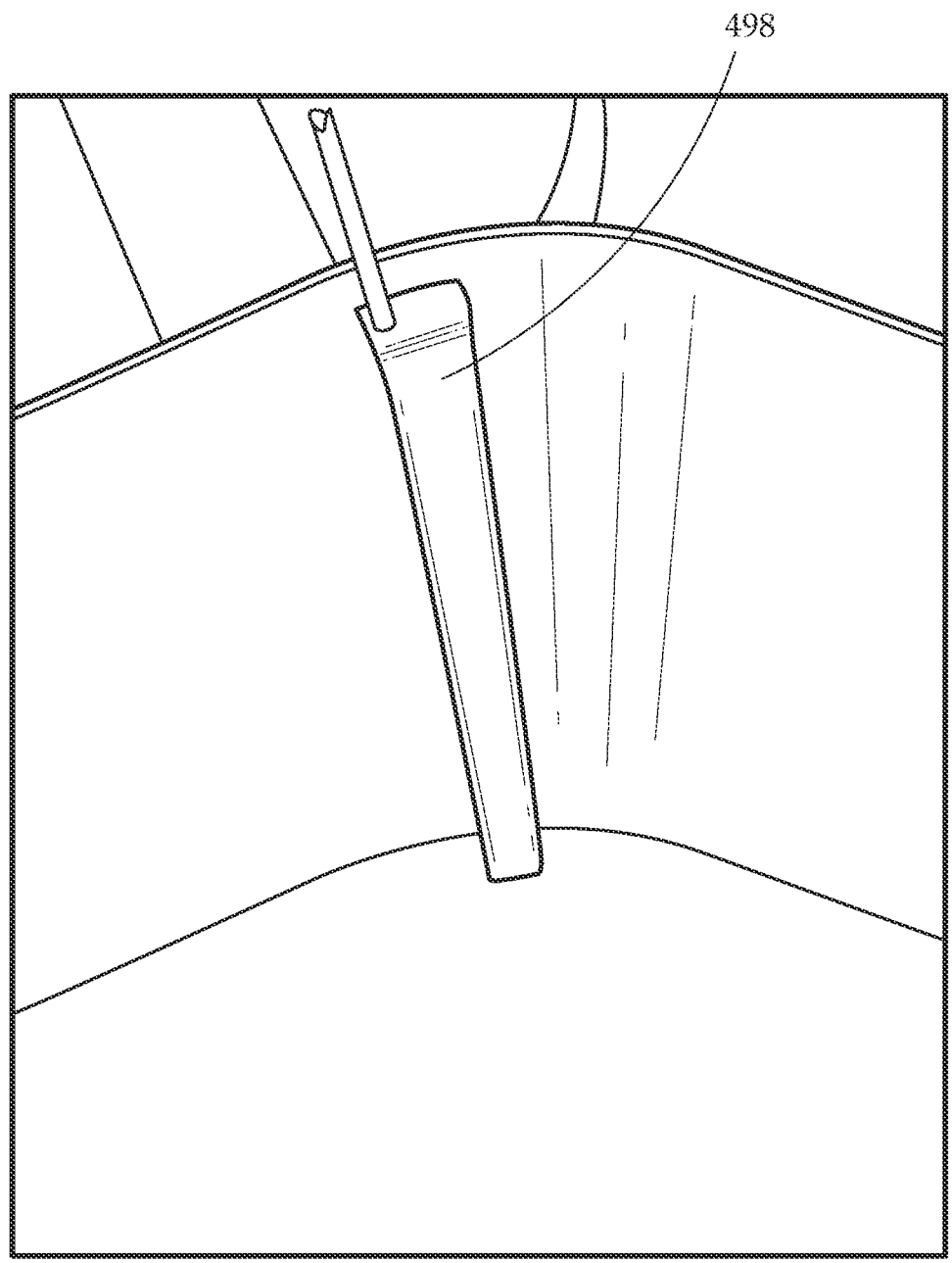
FIG. 31 is a perspective view showing the fabric sleeve inside one embodiment of the present device.

FIG. 31 is a perspective view showing the fabric sleeve 498 inside the backpack 400.

Figure 32:
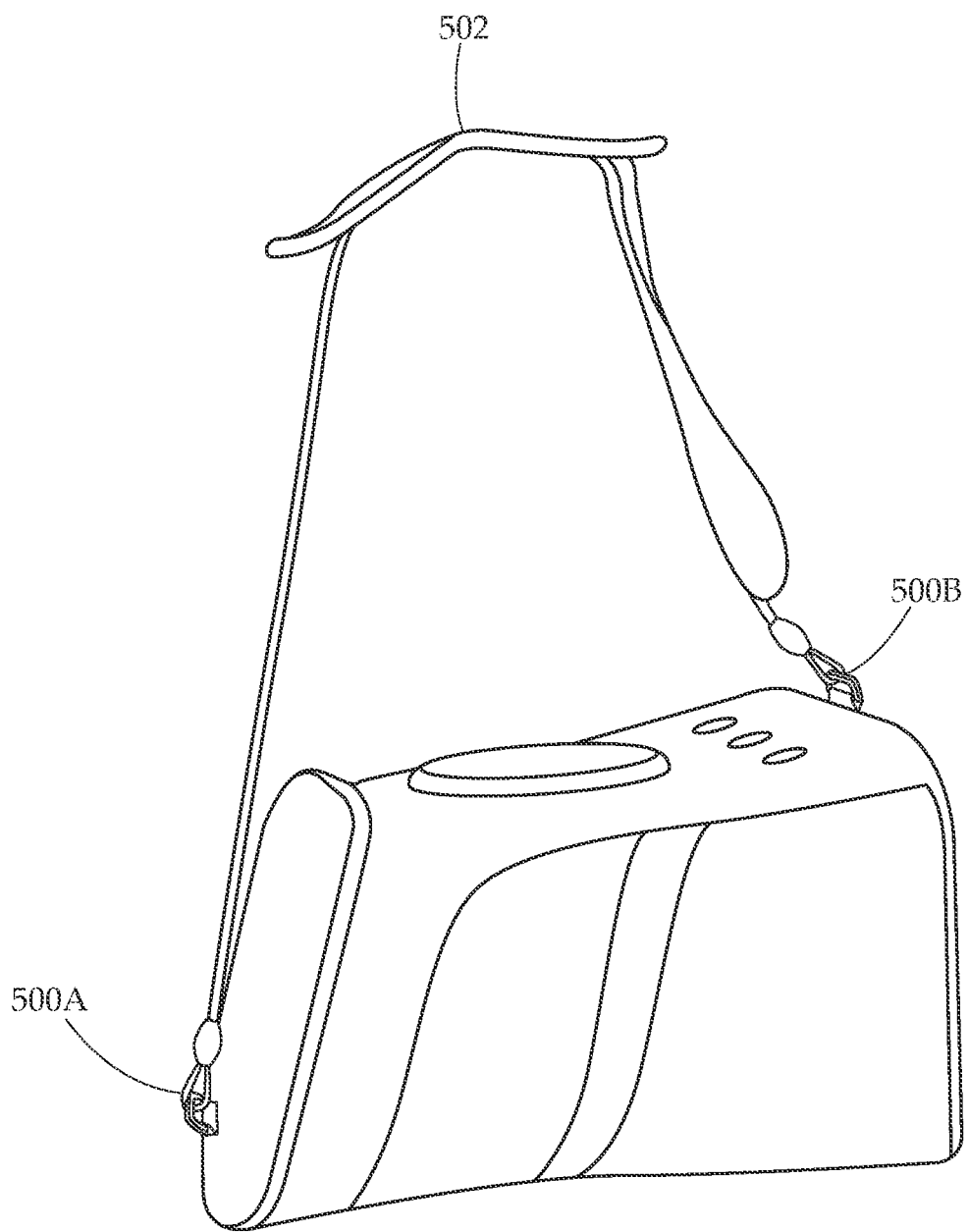
FIG. 32 is a perspective view showing one embodiment of the present device with a detachable shoulder strap.

FIG. 32 is a perspective view showing one embodiment of a pet backpack 500 with a detachable shoulder strap 502, which is removably attached to a top and a bottom of the backpack 500 via clipping mechanisms 500a and 500b so that a pet can potentially have more space when resting.

Figure 33:
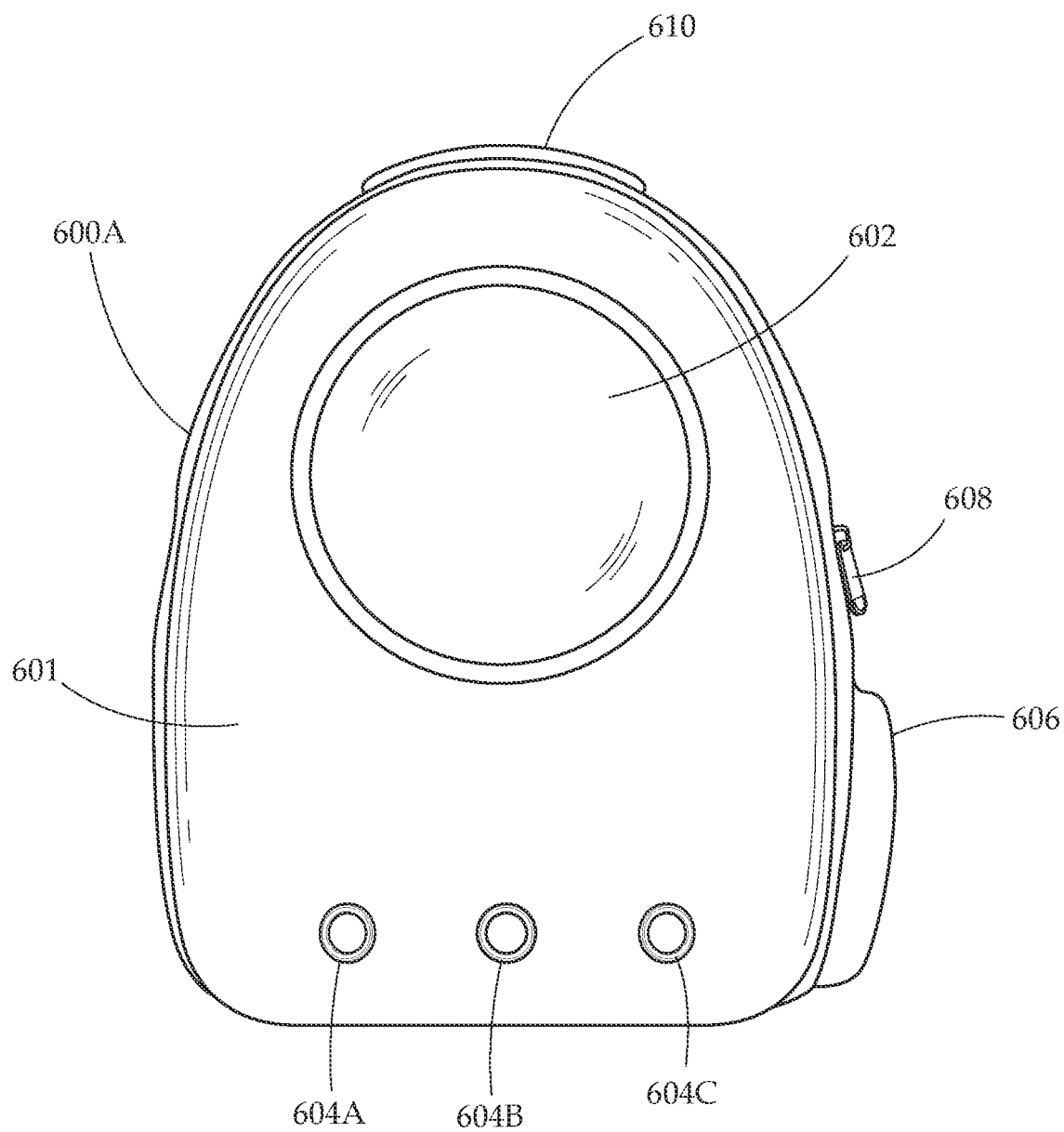
FIG. 33 is a front view of one embodiment of the present device with a hard shell and breathable and transparent hemispheric attachment at the front.

FIG. 33 shows one embodiment of pet backpack 600. A front 600a of the backpack 600 comprises a hard front shell 601 which is more durable, a transparent semispherical attachment with air holes 602, a side pocket 606, a zipper 608 to securely attach the front 600a to the back of the backpack, and a handle 610 at the top of the backpack.

Figure 34:
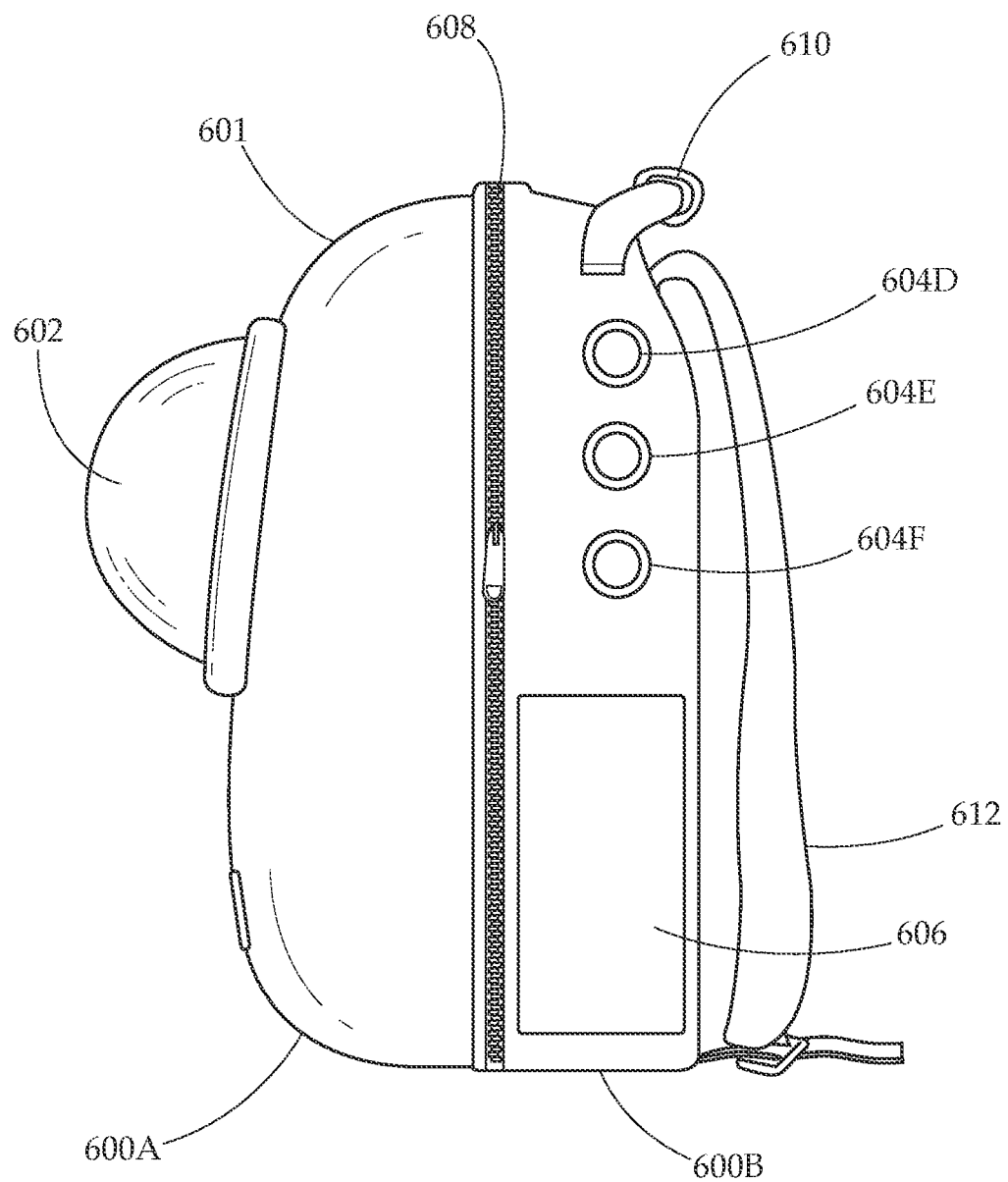
FIG. 34 is a right-hand side view of one embodiment of the present device showing a number of side air holes and a breathable and transparent hemispheric attachment at the front.

In another embodiment of the pet backpack 600 as shown in FIG. 34, a back 600b of the backpack further comprises six air holes 604d-604f and 606g-606i on both sides near the top of the back portion.

Figure 35:
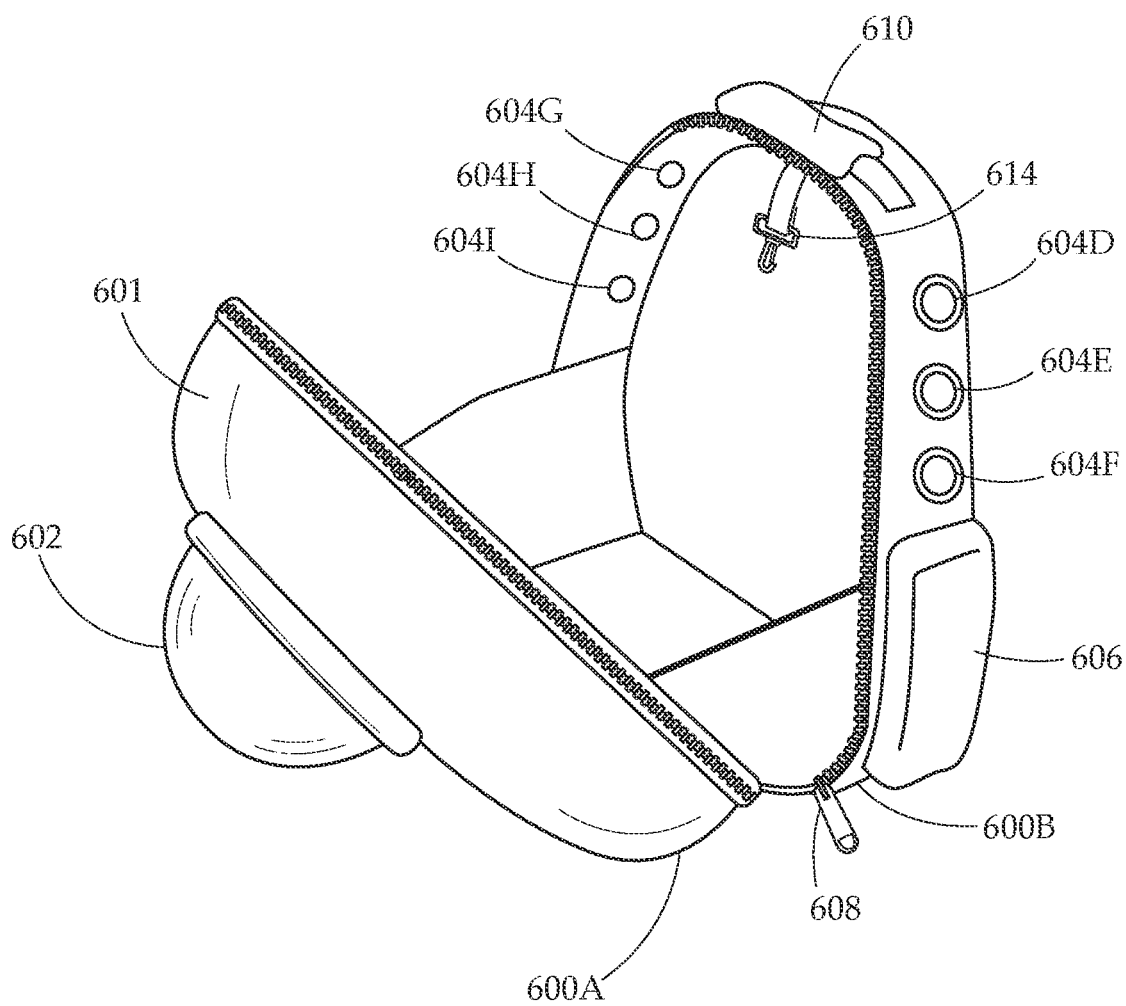
FIG. 35 is a perspective view of one embodiment of the present device showing the details inside.
Figure 36:
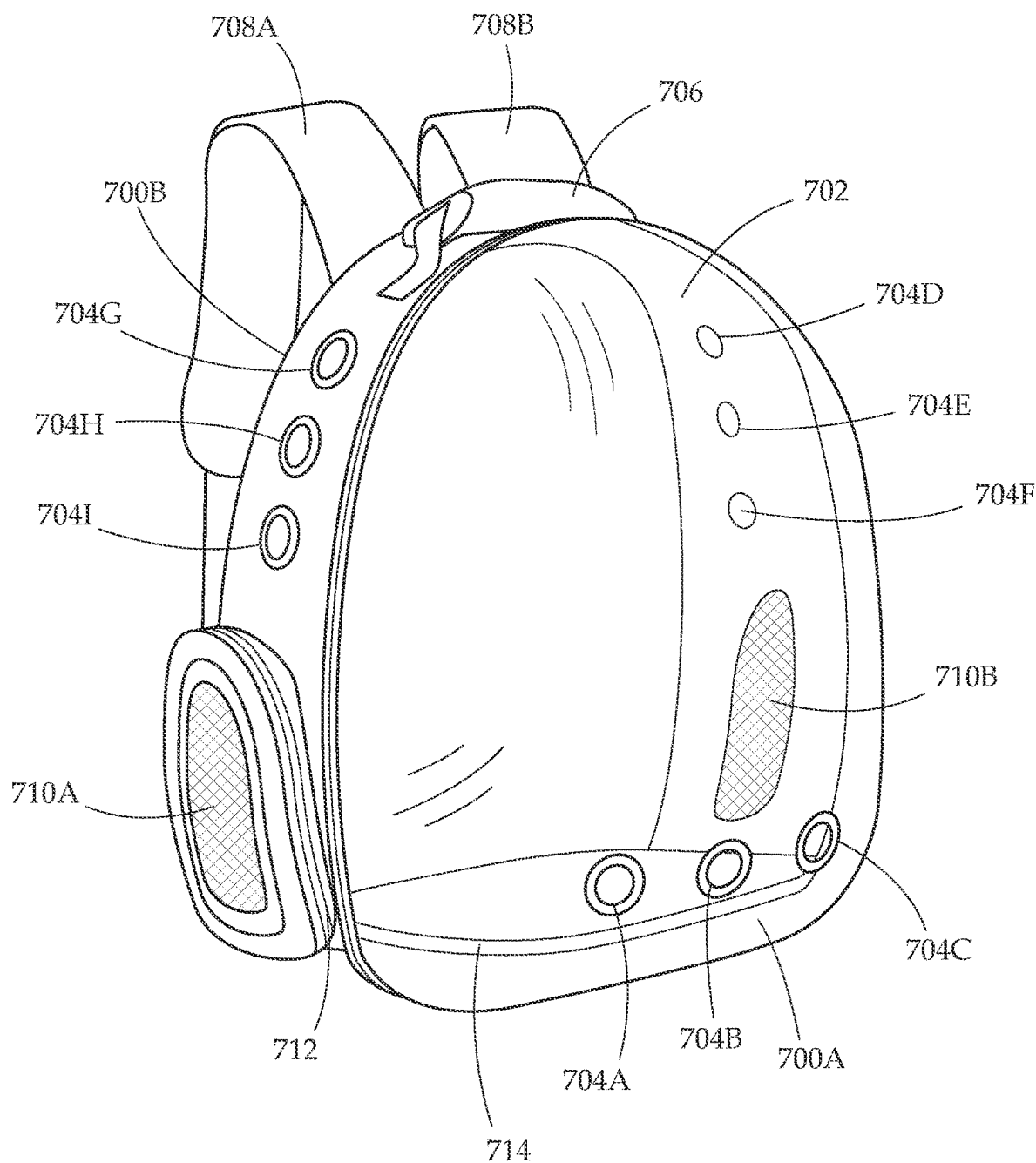
FIG. 36 is a perspective view of one embodiment of the present device showing a transparent front shell with front and side breathable air holes.
Figure 37:
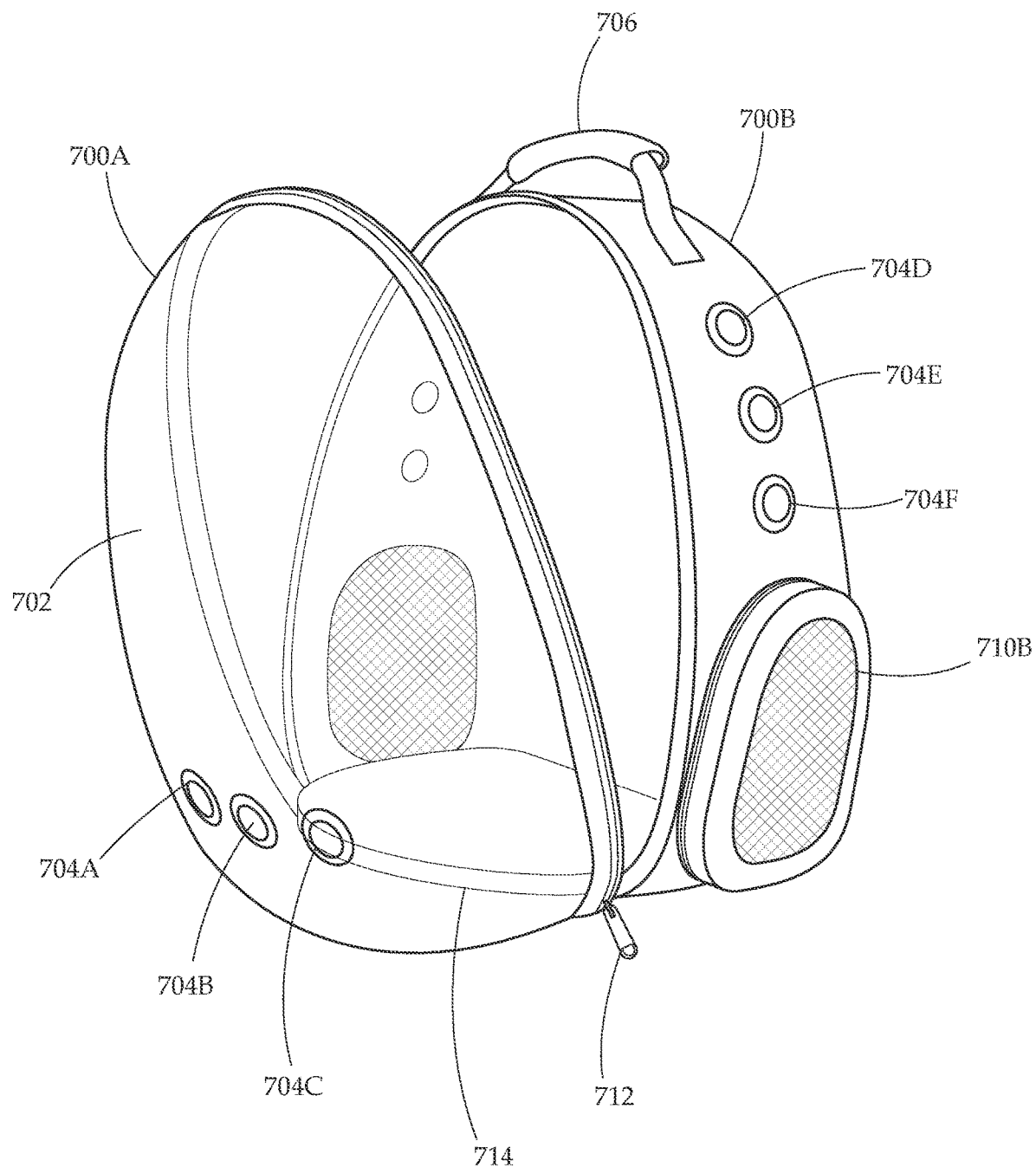
FIG. 37 is a perspective view of one embodiment of the present device showing an unzippered front shell and the details inside.
Figure 38:
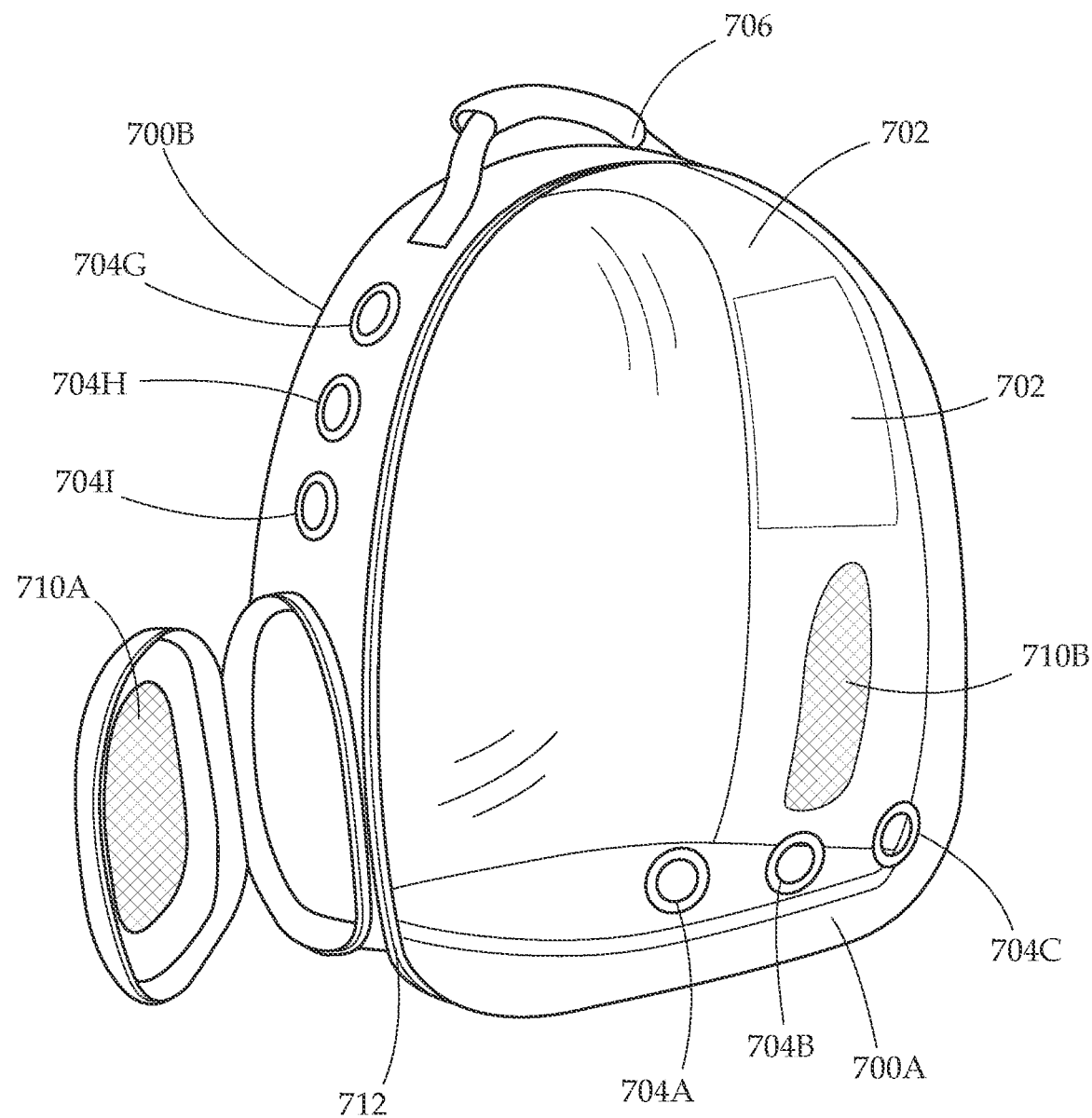
FIG. 38 is a perspective view of one embodiment of the present device showing a transparent front shell with front and side breathable air holes and an unzippered side pocket.
Figure 39:
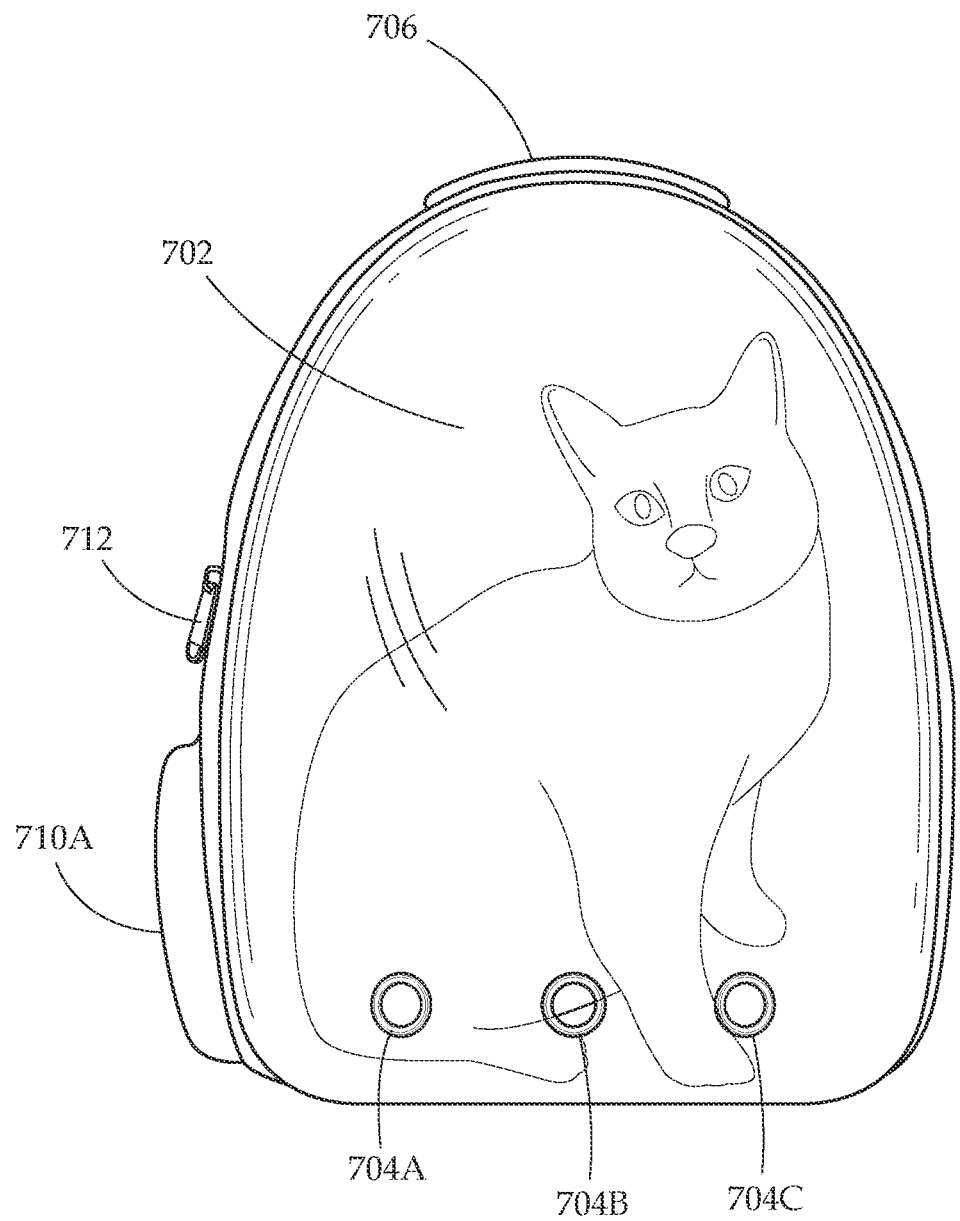
FIG. 39 is perspective view of one embodiment of the present device showing a transparent front shell with front and side breathable air holes and a cat sitting inside the device.

The inside of the pet backpack 600 is shown in FIG. 35, wherein a buckle 614 is attached to the top of the interior. In addition, a handle 610 is shown at the top of the pet backpack, and six air holes 604d-604i are also shown along either side of the back 600b of the backpack.

In yet another embodiment as shown in FIGS. 36-39, a pet backpack 700 comprises a front 700a and a back 700b, wherein the front 700a further comprises a transparent hard shell 702 and three air holes 704a-704c; and wherein the back 700b further comprises six air holes 704d-704i located on an upper portion of the sides of the back, zippered side mesh windows 710a-710b on a lower portion of the sides of the back, two shoulder straps 708a and 708b on the back, and a cushioned bottom 714. The transparent hard shell allows for an unobstructed view and the side mesh windows can be unzippered to provide easy access to the pet inside.

What is claimed is:

1. An animal transport device comprising:
   a main body,
   wherein the main body further comprises:
      a top portion; and
      a bottom portion;
   wherein the top portion further comprises:
      a mesh top;
      a zipper to secure the mesh top to a series of layered fabrics;
      a zipper to secure at least one top of the device;
      at least one fabric loop attached to a D-ring;
      at least one layered fabric surrounding a plurality of zippers;
      a strap and a buckle and a securing device for engaging the buckle;
      at least one shoulder strap; and
      a plurality of materials selected from the group consisting of white mesh, light grey fabric, and light grey webbing;
   wherein the bottom portion further comprises:
      at least one breathable opening located at the front of the main body;
      a plurality of air holes;
      a removable mat insert;
      a plurality of air holes;
      a pair of water bottles pockets; and
      a cushioned bottom;
   a transparent hemispherical attachment at a front of the main body and above the plurality of air holes.

2. The animal transport device of claim 1, wherein the at least one interchangeable opening is removably attached to the main body.

3. The animal transport device of claim 1, wherein the upper portion further comprises at least one breathable and rollable layered fabric that is secured with the buckle surrounding at least one zipper.

4. The animal transport device of claim 1, wherein a first part of the buckle and a second part of the buckle are connected via a clasp as to hold the rollable layered fabric securely.

5. The animal transport device of claim 4, wherein there are gaps between the buckle and at least one strap as to allow the buckle to rest without strain.

6. The animal transport device of claim 1, wherein the device further comprises a 4 mm irremovable plastic rod piping at the top of the device, surrounding the zipper.

7. The animal transport device of claim 1, wherein the device further comprises a hydration pass for a water supply kit that is surrounded by temperature-controlling insulation.

* * * * *